(12) United States Patent
Piestert et al.

(10) Patent No.: US 10,392,494 B2
(45) Date of Patent: Aug. 27, 2019

(54) LATENT THICKENERS, RHEOLOGY CONTROL KIT AND MULTI-COMPONENT SYSTEMS

(71) Applicant: BYK-Chemie GmbH, Wesel (DE)

(72) Inventors: Frederik Piestert, Wesel (DE); Wolfgang Pritschins, Wesel (DE); Sascha Kockoth, Stuttgart (DE); Jürgen Omeis, Dorsten-Lembeck (DE)

(73) Assignee: BYK-Chemie GmbH, Wesel (DE)

( * ) Notice: Subject to any disclaimer, the term of this patent is extended or adjusted under 35 U.S.C. 154(b) by 300 days.

(21) Appl. No.: 14/746,922

(22) Filed: Jun. 23, 2015

(65) Prior Publication Data
US 2015/0368532 A1 Dec. 24, 2015

Related U.S. Application Data
(60) Provisional application No. 62/016,143, filed on Jun. 24, 2014.

(51) Int. Cl.
 *C08K 3/36* (2006.01)
 *C08L 79/02* (2006.01)
 *C08L 63/00* (2006.01)
 *C08K 9/08* (2006.01)

(52) U.S. Cl.
 CPC .............. *C08K 3/36* (2013.01); *C08L 63/00* (2013.01); *C08L 79/02* (2013.01); *C08K 9/08* (2013.01)

(58) Field of Classification Search
 CPC ........... C09J 179/04; C08K 3/34; C08K 3/36; C09D 179/04
 USPC ....................................... 524/612, 507, 745
 See application file for complete search history.

(56) References Cited

U.S. PATENT DOCUMENTS

| | | | |
|---|---|---|---|
| 4,647,647 A | 3/1987 | Haubennestel et al. | |
| 4,762,752 A | 8/1988 | Haubennestel et al. | |
| 4,795,796 A | 1/1989 | Haubennestel et al. | |
| 4,857,111 A | 8/1989 | Haubennestel et al. | |
| 4,942,213 A | 7/1990 | Haubennestel et al. | |
| 5,130,463 A | 7/1992 | Haubennestel et al. | |
| 5,399,294 A | 3/1995 | Quednau | |
| 6,111,054 A | 8/2000 | Haubennestel et al. | |
| 7,312,260 B2 | 12/2007 | Krappe et al. | |
| 7,317,062 B2 | 1/2008 | Pritschins et al. | |
| 7,432,329 B2 | 10/2008 | Haubennestel et al. | |
| 7,851,544 B2 | 12/2010 | Göbelt et al. | |
| 2004/0143035 A1 | 7/2004 | Göbelt et al. | |
| 2005/0250927 A1 | 11/2005 | Pritschins et al. | |
| 2006/0089426 A1 | 4/2006 | Haubennestel et al. | |
| 2007/0259120 A1 | 11/2007 | Haubennestel et al. | |
| 2009/0221745 A1 | 9/2009 | Orth et al. | |
| 2010/0022662 A1 | 1/2010 | Göbelt et al. | |
| 2010/0029834 A1 | 2/2010 | Göbelf et al. | |
| 2010/0099813 A1 | 4/2010 | Göbelt et al. | |
| 2010/0168316 A1 | 7/2010 | Göobelt et al. | |
| 2010/0323112 A1* | 12/2010 | Rick .................... | C09D 7/1216 427/387 |
| 2012/0101210 A1* | 4/2012 | Nennemann ....... | C08G 18/0828 524/507 |
| 2012/0208957 A1* | 8/2012 | Berard .................. | C08G 18/10 524/745 |
| 2014/0012036 A1 | 1/2014 | Omeis et al. | |
| 2014/0194537 A1 | 7/2014 | Göbelt | |
| 2015/0038641 A1 | 2/2015 | Göbelt et al. | |

FOREIGN PATENT DOCUMENTS

| | | |
|---|---|---|
| CA | 2316062 A1 | 2/2001 |
| DE | 102006048744 A1 | 4/2008 |
| DE | 102006062439 A1 | 7/2008 |
| DE | 102006062440 A1 | 7/2008 |
| DE | 102006062441 A1 | 7/2008 |
| DE | 102007005720 A1 | 8/2008 |
| EP | 0154678 B1 | 8/1987 |
| EP | 0281124 A2 | 9/1988 |
| EP | 0438836 A1 | 7/1991 |
| EP | 0270126 B1 | 3/1994 |
| EP | 0318999 B1 | 3/1994 |
| EP | 0417490 B1 | 5/1996 |
| EP | 0835910 A1 | 4/1998 |
| EP | 0879860 B1 | 8/2002 |
| EP | 1081169 B1 | 7/2003 |
| EP | 0893155 B1 | 4/2004 |
| EP | 1416019 A1 | 5/2004 |
| EP | 1486524 A1 | 12/2004 |
| EP | 1640389 A1 | 3/2006 |
| EP | 1650246 A1 | 4/2006 |
| EP | 1593700 B1 | 11/2006 |
| EP | 1803753 A2 | 7/2007 |

(Continued)

*Primary Examiner* — Jane L Stanley
(74) *Attorney, Agent, or Firm* — Schwegman Lundberg & Woessner, P.A.

(57) ABSTRACT

The invention relates to rheology control kits for thickening two- or multi-component systems, comprising at least one module A containing (a1) at least one inorganic thickener and (a2) at least one wetting and dispersing agent that inhibits the thickening effect of the inorganic thickener (a1) and at least one module B containing (b1) at least one polymer that at least partially removes the inhibition of the thickening effect of the inorganic thickener (a1). The invention also relates to two- and multi-component systems into which modules can be incorporated, latent thickeners comprising module A and the use of latent thickeners in order to equip components with a latent thickening effect.

9 Claims, No Drawings

(56) References Cited

FOREIGN PATENT DOCUMENTS

| EP | 1837355 A2 | 9/2007 |
|----|------------|--------|
| EP | 2668240 B1 | 12/2014 |
| WO | WO-2010/147690 A2 | 12/2010 |
| WO | WO-2012/175157 A1 | 12/2012 |
| WO | WO-2012/175159 A1 | 12/2012 |

* cited by examiner

LATENT THICKENERS, RHEOLOGY CONTROL KIT AND MULTI-COMPONENT SYSTEMS

PRIORITY APPLICATIONS

This application claims the benefit under 35 U.S.C. 119(e) to U.S. Provisional Application No. 62/016,143, filed on 24 Jun. 2014; which application is incorporated herein by reference in its entirety.

The present invention relates to latent thickeners, rheology control kits containing them and two- or multi-component systems obtained by using rheology control kits; two- or multi-component systems are, in particular, adhesives, sealants, coating agents or molding compounds. The invention also relates to the use of latent thickeners in the aforementioned two- or multi-component systems.

In particular in the field of adhesives, sealants, coating agents and molding compounds, it is necessary to customize the rheological properties of such systems, primarily through adjusting the consistency by the selection of binding agents, solvents and the concentration of pigments and/or fillers. However, in many cases an adjustment to the desired consistency with the help of the aforementioned components is not sufficient. In such cases, the addition of so-called rheological additives is required. The effect of this can be lowering the viscosity for the purpose of better processability or an increase in viscosity, which in the present invention is referred to as "thickening."

Many different organic or inorganic thickeners are described for the purposes cited.

Principally used in aqueous systems are cellulose ether, starch, natural hydrocolloids, synthetic biopolymers, polyacrylate thickeners, associative thickening agents based on hydrophobically-modified polymers such as polyethers, ether urethanes, polyacrylamides and alkaline activated acrylate emulsions or water swellable inorganic thickeners.

Typical rheological additives for non-aqueous systems include, in addition to organic thickeners such as waxes and thixotropic resins, inorganic thickeners such as, for example, magnesium oxide and magnesium hydroxide, which are used primarily in unsaturated polyester resin systems, or amorphous silicic acids and layered silicates.

However, all the aforementioned inorganic thickeners increase viscosity in aqueous and in particular non-aqueous systems to be thickened directly after incorporation and/or mixing. This is particularly disadvantageous in two- or multi-component systems.

Two-component systems, in a strict sense, mean systems in which a chemical reaction, which leads to hardening, is started by mixing two components in the ratio required for hardening. In this connection, the individual components are typically not coating agents, adhesives, sealants or molding compounds because they are either incapable of crosslinking and/or film formation or do not result in durable films, adhesives or molded parts. The mixture of components must be processed within a certain amount of time (pot life or processing time) because processability progressively worsens after this period of time ends. Such two-component systems are used in particular in the case of especially high requirements in terms of the temperature sensitivity of the object to be coated, excessive size of the object (facades, machines, rotor blades of wind power plants, etc.), resistance to mechanical, chemical and climatic stresses and rapid hardening at room temperature (23° C.) or less, or slightly higher temperatures (up to, for example, 100° C.). However, the present invention uses a broader notion of the two- or multicomponent system, which also comprises physical drying systems made by mixing at least two components that are stored separately prior to use. Such physical drying systems contain at least one of the components of a film-forming binding agent. The term two- or multi-component systems also comprises systems that harden by means of actinic radiation, in particular systems consisting of at least two components that harden by means of UV radiation or electron radiation. The only difference between systems with three or more components and two-component systems is that one or more additional components are added to the mixture; in the case of chemical hardening, they can take part in or trigger the chemical reaction, or serve another purpose. In the case of two- or multi-component systems, each component is stored separately and the preferably reactive mixture of components is only produced when needed.

In conventional two- or multi-component mixtures, the viscosity of each component must be adjusted separately at first to avoid great differences in viscosity. At the same time, the viscosity of the individual components is typically already relatively high, which in turn makes their transport but also homogeneous mixing or processing more difficult.

Therefore, it is especially important for the viscosity of the individual components of two- or multi-component systems to be set at first as low as possible.

In the area of adhesives, for example in epoxide resin/amine hardener systems, the challenge is to adjust both the resin component and the hardener component at first to the lowest possible viscosity in order to guarantee the easiest and most homogeneous mix of components. On the other hand, during and/or preferably after mixing the components, a stable consistency should be set as soon as possible, which prevents the mixture from melting. Only in this way is it possible to apply to adhesive substrates the finished adhesive mixture in layer thicknesses from several millimeters up to centimeters. These requirements apply in particular to large substrates to be bonded, for example rotor blade halves of wind-power equipment.

As EP 281 124 A2 describes, a stable, i.e. highly viscous, consistency is often rapidly achieved by dispersing a thixotropic agent, for example a hydrophilic, pyrogenic silicic acid in the resin and then adding the hardener. Provided that a sufficient amount of thixotropic agent is added, the mixtures will maintain their consistency up until gelation and hardening.

One disadvantage of the aforementioned system is that systems filled with pyrogenic silicic acid, like the initial resin mixture used prior to mixing, are typically highly viscous. The amount of pyrogenic silicic acid that can be used is therefore strictly limited. Moreover, another disadvantage of such systems is that under the influence of mechanical stress or heat before a gelation of the system occurs, the stability is lost and in many cases cannot be retrieved. This is presumably based on the fact that the internal network of hydrogen bridges between the silicic acid particles, which is responsible for the thickening effect, is at least partially collapsed.

One way to prevent the collapse of such networks and thus to maintain stability is to strengthen the network. This is accomplished, for example, by adding a high-molecular polyethylene imine with a weight average molar mass of approx. 750,000 g/mol, as described in EP 0 835 910 A1.

Also known are rheology additives based on polyhydroxy carboxylic acid amides, which in combination with pyrogenic silicic acid in systems containing solvent improve the incorporation of silicic acid and increase and stabilize thixotropic behavior. Such products include compositions that are described in WO 2010/147690 A2 and which are contained in the pyrogenic silicic acid and used simultaneously with a dispersant (Disperbyk-161) to improve the flow of paints.

There is, however, a need for inorganic thickeners whose viscosity-increasing property in the corresponding system is suppressed, i.e. inhibited, until this property is needed.

A chemical way to solve this problem is described in the area of industrial adhesives for bonding halves of rotor blades, for example by Eva Bittmann in the article entitled "A great stir about GFK. Ingredients and methods in rotor blade manufacture," Kunststoffe 92 (11) (2002), pages 119-124. This article describes the use of different resin systems, for example the use of epoxide resins, vinyl ester resins or unsaturated polyester resins for bonding rotor blade components. It should be noted that for bonding shells and bars, thick adhesive seams are necessary; the material must not run off sloping surfaces. Thus, highly thixotropic systems must be used. According to the aforementioned article, the Vantico Company developed a chemical process (not further described) to modify the thixotrophy of epoxide resin adhesives, which is only accomplished by mixing resin and hardener, thus facilitating easy transport of low-viscosity starting components and a high stability of the mixture.

Also used in the area of aqueous systems are, for example, organic thickeners based on homo-, co- and terpolymers of acrylic acid and methacrylic acid, which do not have any thickening effect, as their carboxylic acid groups are protonated. Only by an at least partial neutralization due to the formation of gel structures in the water phase by means of hydrogen bridge bonds, the association of water molecules along the polymer chains and intramolecular repulsion and disentanglement by the formation of carboxyl groups highly viscous solutions are formal. Such polymer thickeners, however, are not used in non-aqueous systems.

It is still extremely desirable also to be able to prepare latent inorganic thickeners that in particular only develop their thickening effect in non-aqueous systems, if this is desired.

It is especially advantageous if the use of an inorganic thickener, for example in adhesives or sealing compound, at the same time increases the bonding strength of the hardened adhesive or sealing compound, thereby increasing the mechanical stability of the adhesive bond. This is particularly beneficial for the use of bonds under great mechanical stress, for example for bonding rotor blades, which as a result can absorb greater mechanical energy.

To date there is no thickening agent system based on latent inorganic thickeners that fulfils the requirements described above.

Therefore, the problem of the present invention was to develop latent inorganic thickeners and rheology control kits that in turn serve the purposeful thickening of two- or multi-component systems, in particular those involving adhesives, sealants, coating agents or molding compounds. The two- or multi-component systems should be able to display the (at first only latent) thickening effect after mixing the components. In particular, the thickeners should also be able to improve the mechanical properties of the hardened two- or multi-component systems, in particular to increase their stability.

The above problems were solved by developing a rheology control kit for thickening two- or multi-component systems comprising at least one module A containing (a1) at least one inorganic thickener and (a2) at least one wetting and dispersing agent, which inhibits the thickening effect of the inorganic thickener (a1) and at least one module B containing (b1) at least one component that at least partially reverses the inhibition of the thickening effect of the inorganic thickener (a1).

The term "kit" is used here, in accordance with common parlance, as a synonym for the term "kit of parts." Accordingly, a kit comprises at least two spatially separate individual components that as a result of a targeted use serve as a functional unit. In the present case, the targeted joint use of the (at first spatially separate) modules A and B consists of equipping two- or multi-component systems with the latent thickening property. This means that after the components of the two- or multi-component systems are mixed, an increase in viscosity takes place.

Modules A and B serve to supplement at least two different components of a two- or multi-component system. The use of both module A and module B in the same component would lead to a premature increase in viscosity and is therefore undesirable. During the supplementation, the compatibility of each module with the respective component of the two- or multi-component system must not be ignored. Modules A and B should under typical storage conditions preferably and to the greatest extent possible act inertly in the respective components of the two- or multi-component system. Inert behavior includes in particular chemically inert behavior. The storage stability can be determined, for example, by the constancy of the viscosity of the stored component supplemented with module A or B. The viscosity of the component supplemented with the respective module should not change, or only to a minor extent, preferably even over a long period of storage. However, such possible (even though undesired) increases in viscosity are not caused by the effect according to the invention because not all necessary additives interact with one another at the same time, but rather exist separately in the various base components.

Module A
Inorganic Thickener (a1)

Inorganic thickener (a1) is preferably selected from the group consisting of layered silicates and amorphous silicic acids, most preferably layered silicates and precipitated or pyrogenic silicic acid. Precipitated silicic acids are obtained wet-chemically by precipitation, whereas pyrogenic silicic acids are obtained by continuous flame hydrolysis.

Preferred inorganic thickeners include in particular layered silicates and pyrogenic silicic acids. In contrast to silicic acids obtained wet-chemically (precipitated silicic acids), which for the most part have very high inner surfaces, silicic acids obtained by flame hydrolysis consist of nearly spherical primary particles with particle diameters typically from 7 to 40 nm. They essentially have only one outer surface. This surface is partially filled with silanol groups. The high proportion of free silanol groups lends untreated pyrogenic silicic acid a hydrophilic character. However, it is also possible, but costlier, to subsequently treat the originally hydrophilic surface of pyrogenic silicic acids organically, for example with dimethyl dichlorosilane, trimethoxy octyl silane or hexamethyl disilazane, wherein most of the silanol groups are saturated by organic groups, thus hydrophobizing the hydrophilic silicic acid. Thus, pyrogenic silicic acids can be present in the form of non-organically modified pyrogenic silicic acids or hydrophobically modified pyrogenic silicic acids; non-organically modified pyrogenic silicic acids are especially preferred.

Among layered silicates, clay materials are particularly preferred; among these, organically modified clay materials (also known as organoclays) are especially preferred.

Most especially preferred as inorganic thickeners (a1) are mixtures of layered silicates that were surface-treated with quaternary alkyl ammonium salts and which comprise 50 to 95% by weight, in relation to the layered silicate mixture, of a clay mineral selected from the group consisting of sepiolite and palygorskite or mixtures thereof and contain less than 50% by weight, in relation to the layered silicate mixture, of at least one smectite. Preferably, the 50 to 95% by weight of sepiolite and/or palygorskite is supplemented with the at least one smectite at least 95% by weight, especially preferred at 100% by weight, in relation to the layered silicate mixture.

The smectite or smectites can in turn be preferably selected from the group consisting of hectorite, montmorillonite, bentonite, beidelite, saponite, stevensite and mixtures thereof.

Quaternary alkyl ammonium salts can be preferably described by the general formula $(C_{1-10}\text{-alkyl})_n(C_{12-22}\text{-alkyl})_m(\text{benzyl})_p\ N^+X^-$, wherein n+m+p=4 and n=1 or 2, m=1 or 2, p=0 or 1 and $X^-$=halogenide, preferably chloride or sulfate. Especially preferred quaternary alkyl ammonium salts are dimethyl-di($C_{14-18}$-alkyl) ammonium chloride, methyl-benzyl-di($C_{14-18}$-alkyl) ammonium chloride, dimethyl-benzyl-($C_{14-18}$-alkyl)ammonium chloride, and dimethyl-(2-ethylhexyl)-($C_{14-18}$-alkyl)ammonium sulfate. The above $C_{14-18}$ alkyl group is preferably a hydrogenated tallow-alkyl group.

Especially preferred is the previously described layered silicate mixture treated with 5 to 80 milli-equivalents of the quaternary alkyl ammonium salt.

Such thickeners are sold by BYK Chemie GmbH, Wesel, Germany under the trade name Garamite®.

Other inorganic thickeners (a1) of the category of layered silicates are likewise sold by BYK Chemie GmbH, for example, under the trade names Laponite®, Claytone® or Cloisite®.

Wetting and Dispersing Agent (a2)

The basic requirement for the wetting and dispersing agent (a2) is that it inhibits the thickening effect of the thickener (latent thickening).

Wetting and dispersing agents (a2) have one or more thickener-affine groups X and thus bond to the surface of the thickener covalently, ionically and/or by physisorption. In other respects, they act to stabilize the thickener primary particles and thus prevent agglomeration, which otherwise leads to sedimentation of the solids and thus separation of the mill base system. Generally, one or more groups Y in the wetting and dispersing agent (a2), which ensure compatibility with the surrounding medium, are responsible for this stabilization.

Preferably, the wetting and dispersing agents used (a2) are high-molecular wetting and dispersing agents (a2), in particular polymer wetting and dispersing agents (a2). Suitable functional polymers preferably have a number average molecular mass ($M_n$) of at least 400 g/mol, preferably at least 800 g/mol, and preferred at least 2000 g/mol. The maximum molecular weight $M_n$ is usefully at 100,000 g/mol, preferred at 50,000 g/mol and especially preferred at 25,000 g/mol. The number average molecular weights can be determined by means of gel permeation chromatography against a polystyrene standard.

In particular, the wetting and dispersing agents used according to the invention (a2) can be selected from the group of linear or branched polymers and copolymers with functional and/or thickener-affine groups, alkyl ammonium salts of polymers and copolymers, polymers and copolymers containing acid groups, comb and block copolymers, such as block copolymers containing, in particular, basic thickener-affine groups, possibly modified acrylate block copolymers, possibly modified polyurethanes, possibly modified and/or possibly salinized polyamines, epoxide amine adducts, phosphoric acid esters, in particular of polyethers, polyesters and polyether esters, basic or acid ethoxylates such as alkoxylated mono- or polyamines or acid 1,2-dicarboxylic acid anhydride half-esters of alkoxylated mono-alcohols, reaction products of unsaturated fatty acids containing mono-, di- and polyamines, amino alcohols, and unsaturated 1,2-dicarboxylic acids and their anhydrides and their salts and reaction products containing alcohols and/or amines; polymers and copolymers containing fatty acid radicals, possibly modified polyacrylates, such as transesterified polyacrylates, possibly modified polyesters, such as acid-functional and/or amino-functional polyesters, polyphosphates, and mixtures thereof.

Preferably, compounds are selected as wetting and dispersing agents (a2) in particular like those described in the publications EP 0 154 678 B1, EP 0 270 126 B1, EP 0 318 999 B1, EP 0 417 490 B1, EP 0 879 860 B1, EP 0 893 155 B1, EP 1081 169 B1, EP 1416 019 A1, EP 1486 524 A1, EP 1593 700 B1, EP 1640 389 A1, EP 1650 246 A1, EP 1742 90, EP 1803 753, EP 1837 355, EP 2668240, WO 2012175159, WO 2012175157, DE 102006048144, DE 102006062439, DE 102006062440, DE 102006062441 and DE 102007005720; especially preferred are the wetting and dispersing agents (a2) described in EP 0 893 155 B1 and EP 2668240.

Polymer wetting and dispersing agents (a2) based on polyisocyanates are described, for example, in EP 0 154 678, EP 318 999 and EP 0 438 836. These products are manufactured by the addition of monohydroxy compounds, diisocyanate-functional compounds and compounds having a tertiary amino group to the existing NCO groups of polyisocyanates having isocyanurate, biuret, urethane and/or allophanate groups.

In one preferred embodiment, wetting and dispersing agents (a2) are used that are obtained by salinizing an amino-functional compound by means of an acid, wherein as an amine-functional compound a polyamine containing at least three amino groups from the group of "non-modified, aliphatic linear or branched polyamines of the group: "diethylene triamine, triethylene tetramine, tetra ethylene pentamine, pentaethylene hexamine, hexamethylene heptamine, linear polymerisates of the general formula $NH_2—(C_2H_4NH)_n—C_2H_4—NH_2$ with n>5, wherein for these protons on the nitrogen can be exchanged for alkyl, aryl and/or aralkyl groups and/or the nitrogen can be quaternized, branched ($C_2$-$C_4$) alkylene amines and poly($C_2$-$C_4$) alkylene imines containing tertiary amino groups and a number average molecular weight up to 1,000,000 g/mol or a mixture of such amines"; modified polyamines based on the aforementioned non-modified polyamines, wherein they are mono- or polyisocyanates containing v NCO groups of which (v-1) NCO groups have previously reacted with other reactants, reacted polyamines, polyamines reacted with epoxy-functional substances, polyamines reacted with cyclic carbonates, polyamines reacted by means of a Michael reaction with α,β-unsaturated compounds, alkylated and/or quaternized polyamines and/or polyamines amidated with carboxylic acids, with the proviso that after modification, there are still three salinizable amino groups available per molecule, or a mixture of such polyamines and/or polyamines of the group: "homo- or copolymerisates of amine-functional (meth)acrylates or vinyl compounds, as well as amine-functional homo- or copolymers whose amino group was inserted by means of a polymer-analogous reaction into the prefabricated polymer or was produced on this polymer, or a mixture of such polyamines," wherein the homo- or copolymerisates having a number average molecular weight of up to 1,000,000 g/mol" is used and wherein used as an acid is a substance from the group of "phosphoric acid esters of the general formula: $(OH)_{3-n}PO(OR^a)_n$ with n=1 or 2, sulfonic acids of the general formula $HOSO_2R^b$, acid sulfuric acid esters of the general formula $HOSO_3R^b$," wherein $R^a$ and $R^b$ represent an alkyl, aryl or aralkyl group containing at least 5 carbon atoms and/or a group of an oxalkylated alcohol having a number average molecular weight between 100 and 5,000 g/mol and/or a group containing at least one carboxylic acid ester group and/or a urethane group having a number average molecular weight between 100 and 5,000 g/mol, or a mixture of such substances, wherein $R^a$ and $R^b$ are the same or different and, if applicable, hydrogen atoms in the aliphatic groups of the groups $R^a$ and $R^b$ are partially replaced by halogen atoms and the acid contains possibly other functional groups that behave inertly during salinization; and at least one amino group is salinized per molecule.

The following groups of wetting and dispersing agents (a2) demonstrate an especially good effect in the dispersions according to the invention: (a) phosphor ester salts of oligomers or polymers containing amino groups, for example phosphor ester salts of possibly fatty acid-modified or alkoxylated (in particular ethoxylated) polyamines, phosphor ester salts of epoxide polyamine adducts, phosphor ester salts of acrylate or methacrylate copolymers containing amino groups and phosphor ester salts of acrylate polyamine adducts, (b) mono- or diesters of phosphoric acid, for example mono- or diesters of phosphoric acid containing alkyl, aryl, aralkyl or alkyl aryl alkoxylates (e.g. phosphoric acid mono- or diesters of nonyl phenol ethoxylates, isotridecyl alcohol ethoxylates, butanol-started alkylene oxide polyethers), mono- or diesters of phosphoric acid containing polyesters (e.g. lactone polyesters, such as caprolactone polyesters or mixed caprolactone/valerolactone polyesters), (c) acid dicarboxylic acid half-esters, for example acid dicarboxylic acid half-esters (in particular succinic acid, maleic acid or phthalic acid) containing alkyl, aryl, aralkyl or alkyl aryl alkoxylates (e.g. nonyl phenol ethoxylates, isotridecyl alcohol ethoxylates or butanol-started alkylene oxide polyethers), (d) polyurethane polyamine adducts, (e) polyalkoxylated mono- or diamines (e.g. ethoxylated oleyl amine or alkoxylated ethylene diamine); (f) reaction products of unsaturated fatty acids and mono-, di- and polyamines, amino alcohols, and unsaturated 1,2-dicarboxylic acids and their anhydrides and their salts and reaction products with alcohols and/or amines.

Such wetting and dispersing agents (a2) are sold as commercial products, for example, by Wesel-based BYK-Chemie under the trade names BYK-220 S, BYK-P 9908, BYK-9076, BYK-9077, BYK-P 104, BYK-P 104 S, BYK-P 105, BYK-W 9010, BYK-W 920, BYK-W 935, BYK-W 940, BYK-W 960, BYK-W 965, BYK-W 966, BYK-W 975, BYK-W 980, BYK-W 990, BYK-W 995, BYK-W 996, BYKUMEN, BYKJET 9131, LACTIMON, ANTI-TERRA-202, ANTI-TERRA-203, ANTI-TERRA-204, ANTI-TERRA-205, ANTI-TERRA-206, ANTI-TERRA-207, ANTI-TERRA-U 100, ANTI-TERRA-U 80, ANTI-TERRA-U, LP-N-21201, LP-N-6918, DISPERBYK, DISPERBYK-101, DISPERBYK-102, DISPERBYK-103, DISPERBYK-106, DISPERBYK-107, DISPERBYK-108, DISPERBYK-109, DISPERBYK-110, DISPERBYK-111, DISPERBYK-112, DISPERBYK-115, DISPERBYK-116, DISPERBYK-118, DISPERBYK-130, DISPERBYK-140, DISPERBYK-142, DISPERBYK-145, DISPERBYK-160, DISPERBYK-161, DISPERBYK-162, DISPERBYK-163, DISPERBYK-164, DISPERBYK-165, DISPERBYK-166, DISPERBYK-167, DISPERBYK-168, DISPERBYK-169, DISPERBYK-170, DISPERBYK-171, DISPERBYK-174, DISPERBYK-176, DISPERBYK-180, DISPERBYK-181, DISPERBYK-182, DISPERBYK-183, DISPERBYK-184, DISPERBYK-185, DISPERBYK-187, DISPERBYK-190, DISPERBYK-191, DISPERBYK-192, DISPERBYK-193, DISPERBYK-194, DISPERBYK-2000, DISPERBYK-2001, DISPERBYK-2008, DISPERBYK-2009, DISPERBYK-2010, DISPERBYK-2020, DISPERBYK-2025, DISPERBYK-2050, DISPERBYK-2070, DISPERBYK-2090, DISPERBYK-2091, DISPERBYK-2095, DISPERBYK-2096, DISPERBYK-2150, DISPERBYK-2151, DISPERBYK-2152, DISPERBYK-2155, DISPERBYK-2163, DISPERBYK-2164, DISPERPLAST-1010, DISPERPLAST-1011, DISPERPLAST-1012, DISPERPLAST-1018, DISPERPLAST-I, and DISPERPLAST-P. If a low concentration of volatile organic compounds, in particular of organic solvents is desired, the above-named commercial products should be used as much as possible as a solvent-free active substance and, if applicable, should be for example by distillation completely or partially be purified from volatile components.

Inhibiting the thickening effect means that the thickener loses at least some of its otherwise present viscosity-increasing effect from the presence of the wetting and dispersing agent (a2). This loss of the viscosity increase is due to an interaction between the thickener and the wetting and dispersing agent. Inhibiting the thickening effect, i.e. the loss of thickening or the reduction of the thickening effect of the thickener (a1) by the wetting and dispersing agent (a2) can also be given as a percentage, as shown in the example part. In this connection, the viscosity of a module A or base paint component supplemented with module A but without adding the wetting and dispersing agent (a2) is measured as a base value and is compared with a complete module A or with an otherwise identical base paint component supplemented with a complete module A, i.e. one containing the wetting and dispersing agent (a2). From this the percentage drop in viscosity is calculated caused by the presence of the wetting and dispersing agent (a2). Preferably, this drop is at least 10%, especially preferred at least 20%, most especially preferred at least 40% or at least 80% or even at least 90% to preferably 99.9%. The viscosity is determined as is indicated in the example part.

The inhibition of the thickening effect is preferably caused by a reversible bonding of the wetting and dispersing agent (a2) to the surface of the inorganic thickener (a1).

A reversible bonding of the wetting and dispersing agent (a2) should be present at temperatures under which two- or multi-component systems are typically mixed. Preferably, reversibility is present at temperatures under 80° C., especially preferred at temperatures under 50° C. and most especially preferred at temperatures under 30° C., in particular at room temperature (23° C.).

To ensure the reversibility of the bonding the wetting and dispersing agent (a2) is preferably selected so that weak intermolecular interactions, for example Van der Waals interactions, dipole-dipole interactions, or hydrogen bridge bonds are formed in relation to the surface of the inorganic thickener, which prevents the partial or complete display of the rheological properties of the inorganic thickener.

The wetting and dispersing agents (a2) preferably act essentially chemically inertly in relation to the other components of module A or the components of the basic component into which module A is inserted.

The essentially chemical inertness in relation to the components of module A or the components of the basic component into which module A is inserted can basically be achieved in two ways. One option is that a wetting and dispersing agent is used that doesn't contain any groups that are reactive against the aforementioned components or which is triggered by the catalytic activity of undesired reactions. A second option is to use wetting and dispersing agents that although they contain potentially reactive groups, they are, for example, so sterically shielded that a reaction does not take place with the components of module A or the parts of the component of the two- or multi-component system into which module A is inserted under storage conditions or takes place extremely slowly.

In the context of the present invention, especially suitable and generally applicable wetting and dispersing agents (a2) have proven to be wetting and dispersing agents that have a polymer backbone containing amino groups to which polyester and/or polyether and/or polyester as well as polyether side chains are attached. Such wetting and dispersing agents are especially suitable for inorganic thickeners (a1) that are selected from the group of layered silicates, precipitated silicic acids and pyrogenic silicic acids, in particular layered silicates and pyrogenic silicic acids, and especially preferred layered silicates and non-organically modified pyrogenic silicic acids. The polyester and/or polyether and/or polyester as well as polyether side chains of such wetting and dispersing agents can be compressed by abrading the inorganic thickeners, wherein the adhesive forces of the amine groups are strengthened in relation to the surface of the thickener. The thickener-affine amine groups can then be adsorbed to the surface of the thickener, while the side chains shield the amine groups. Therefore, such wetting and dispersing agents that contain shielded amine groups can also be used in conjunction with those components of two- or multi-component systems that are actually reactive to amine groups, like for example in solvent-containing or solvent-free epoxide resins. Thus, no appreciable reaction takes place between the epoxy groups of the resin and shielded amino groups of the wetting and dispersing agent, so that behavior essentially chemically inert within the meaning of this invention is present. At the same time, the wetting and dispersing agent shields the inorganic thickener and prevents it from completely or partially displaying its thickening effect.

Especially suitable, for example, are reaction products from (a.) polyhydroxy monocarboxylic acids, which preferably are polyester-modified, with (b.) aziridine homopolymers, which preferably are polyester-modified, and (c.) monoisocyanates containing polyester groups, polyether groups, polyester-polyether groups or the group of a hydroxy carboxylic acid; the latter compounds can be obtained, for example, by reacting an isocyanate group of a diisocyanate with the hydroxyl group of a hydroxy carboxylic acid. Such products are disclosed, for example, in EP2668240 A1.

A wetting and dispersing agent (a2) especially suitable for use within the context of this invention is, for example, BYK Chemie GmbH's highly branched wetting and dispersing agent DISPERBYK-2151, which previously was only recommended for pigment and fillers. This wetting and dispersing agent facilitates an excellent dispersion of layered silicates, precipitated silicic acids and pyrogenic silicic acids, in particular layered silicates and pyrogenic silicic acids, in many chemically different components. For example, there is also compatibility with epoxide resins, like those used in epoxide resin amine hardener two-component systems, as well as in polyols that are used in polyol (resin) polyisocyanates hardener two-component systems (polyurethane systems). They can also be used in unsaturated polyester resins or unsaturated acrylate-based systems, as well as in many other systems.

The compatibility of the wetting and dispersing agent with the respective system is immediately obvious to the person skilled in the art when, for example, no reaction is to be expected due to the absence of complementary reactive groups or the corresponding groups are sterically shielded. Thus, there are in principle many wetting and dispersing agents available. The person skilled in the art can carry out an individual assessment of whether a steric shielding of potentially reactive groups is sufficient in the wetting and dispersing agent to use it in a specific two- or multi-component system by conducting simple tests.

At a minimum, module A contains an inorganic thickener (a1) and at least one wetting and dispersing agent (a2), as well as possibly one or more organic solvents different from (a1) and (a2) and/or water.

In principle, module A can be solid at room temperature (23° C.). A solid module A is preferably an inorganic thickener (a1) coated with a wetting and dispersing agent (a2), preferably in powder form.

For each form of module A, i.e. in particular the form containing the liquid, organic solvent and/or water or the solid form of module A, it applies that the module in relation to the weight of the solid body in module A, preferably at least 50% by weight, especially preferred at at least 80% by weight, most especially preferred at at least 90% by weight and extremely preferred at 100% by weight, consists of the one or more inorganic thickeners (a1) and the one or more wetting and dispersing agents (a2). The weight of the solid body of module A equals the total weight of module A, minus the weight of the one or more organic solvents used and of the water, if any.

Because the wetting and dispersing agents (a2) are frequently used in the form in which they emerge during synthesis, the wetting and dispersing agents (a2) may also contain due to manufacturing reasons additives used for the synthesis such as, for example, catalysts, stabilizers and the like. Such additives are viewed as belonging to the solid body of module A.

Module B
Component (b1)

Component (b1) is characterized in that it at least partially removes the inhibition of the thickening effect of the inorganic thickener (a1) caused by the wetting and dispersing agent.

Involved in this connection can be monomeric compounds or oligomers or polymer species, wherein linguistically there is no difference here between oligomers and polymer species. Oligomer species are therefore subsumed below under polymer species.

The bonding of component (b1) preferably takes place during the at least partial displacement of the wetting and dispersing agent (a2) from the surface of the thickener, which means that the interaction of component (b1) with the surface of the inorganic thickener (a1) is generally stronger than the interaction of the wetting and dispersing agent (a2) with the surface of the inorganic thickener (a1).

Therefore, the thickener-affine groups of component (b1) typically are not shielded. However, a higher affinity can also be obtained if components (b1) have, for example, a greater number of thickener-affine groups compared to the wetting and dispersing agent (a2) and/or the type of affine groups permits a stronger bond to the surface of the thickener.

It is essential that component (b1) at least partially removes the inhibition of the thickening effect of the inorganic thickener (a1) by the wetting and dispersing agent (a2). Especially preferred is when the thickening effect of the thickener is not only at least partially or completely restored but rather even stabilizes the stability by, for example, strengthening the internal network of hydrogen bridges between the thickener particles by component (b1).

One suitable component (b1) that, for example, is more affine compared to pyrogenic silicic acids than the wetting and dispersing agent DISPERBYK-2151, which is also mentioned above as an example, is the high-molecular polyethylene imine having a weight average molar mass of approx. 750,000 g/mol, like the one described in the above-cited EP 0 835 910 A1. It is not only able to at least partially remove the inhibition of the thickening effect of the thickener by the wetting and dispersing agent, it also stabilizes the stability-causing network between the thickener particles. However, other polymer amines and fatty acid salinized polyethylene imines, preferably tall oil fatty acid salinized polyethylene amines, are also suitable as component (b1).

Other suitable components (b1) include condensation products from dimeric and/or trimeric fatty acids, which can also be used mixed with monomeric fatty acids, along with amines. Suitable as amines for this purpose are in particular aliphatic and cycloaliphatic or even aromatic amines of mixtures of the aforementioned amines. Examples of such amines are m-xylylene diamine, 1,6-diaminohexane, isophorone diamine (isomer mixture; IPDA), triethylene tetramine (TETA); diethylene triamine, tetra ethylene pentamine, pentaethylene hexamine (isomer mixture), 1,3-diaminopropane, dipropylene triamine or 2-(2-(2-aminoethyl-amino)ethyl amino)ethanol or diethanol amine.

Non-polymeric mono- and preferably polyamines are also suitable as component (b1), especially those that are molecularly uniform and/or which have low number average molecular weight $M_n$, like, for example, polyalkylene polyamines such as, for example, triethylene tetramine, but also cycloaliphatic diamines such as, for example, isophorone diamine.

Also suitable are monoether amines such as diglycol amine (DGA), but also in particular polyether amines such as, for example, those sold by Huntsman under the trade name Jeffamine® like Jeffamine® T-403.

Also suitable are polyethylene oxide polyols such as, for example, polyoxyethylene sorbitan monolaurate (TWEEN 20).

Module B contains at least component (b1) and possibly one or more solvents different from (b1) and/or water.

In principle, module B can be solid at room temperature (23° C.). A solid module A is preferably a solid component (b1), preferably in powder form.

Module B can also consists of a liquid or solid component (b1).

For each form of module B, i.e. in particular the form containing the liquid, possibly organic solvent and/or water or the solid form of module A, it applies that the module in relation to the weight of the solid body in module A, preferably contains at least 50% by weight, especially preferred at at least 80% by weight, most especially preferred at at least 90% by weight and extremely preferred at 100% by weight, component (b1). The weight of the solid body of module B equals the total weight of module B, minus the weight of the one or more organic solvents used and of the water, if any.

Because component (b1) is frequently used in the form in which it emerges during synthesis, component (b1) may also contain due to manufacturing reasons additives used for the synthesis such as, for example, catalysts, stabilizers and the like. Such additives are viewed as belonging to the solid body of module B.

Component (b1) is contained in module B of the modular system according to the invention. In two-component systems, module B is typically added to the hardener component, provided it acts inertly in the above sense in relation to the parts of the component.

The targeted selection of a suitable component (b1) is preferably made taking into account the choice of wetting and dispersing agent (a2).

Thus, component (b1) typically has more polar and/or more basic surface-affine groups as the wetting and dispersing agent (a2), wherein the surface affinity is related to the surface of the inorganic thickener (a1). If the wetting and dispersing agent (a2) contains similar polar and/or basic, surface-affine groups like in component (b1), component (b1) will preferably contain a greater percentage by weight proportion of surface-affine groups in component (b1) compared to the percentage by weight proportion of surface-affine groups that are contained in the wetting and dispersing agent (a2). Component (b1) contains, especially preferably in comparison to the wetting and dispersing agent (a2), not only a greater percentage by weight proportion of groups that are affine in relation to the surface of the inorganic thickener (a1) but also surface-affine groups are more polar and/or more basic compared to the surface-affine groups of the wetting and dispersing agent (a2). Most especially preferred are surface-affine groups that are more polar and more basic compared to the surface-affine groups of the wetting and dispersing agent (a2).

On the other hand, this means that when choosing the wetting and dispersing agent (a2), the "best" wetting and dispersing agent for a dispersion of the inorganic thickener (a1) which provides the maximum reduction in viscosity in relation to the inhibition of the thickening effect does not have to be or should not be selected. A too-strong bond of the wetting and dispersing agent (a2) to the surface of the thickener is not desired in order to not unnecessarily make it more difficult for component (b1) to displace the wetting and dispersing agent (a2) from the surface of the inorganic thickener (a1).

Thus, the goal is to achieve a sufficient to very good reduction of viscosity by the wetting and dispersing agent (a2) but not a perfect dispersion of the inorganic thickener (a1), which makes it possible that in a second step, component (b1) enters into a very good to perfect interaction with the surface of the inorganic thickener (a1), thus increasing the viscosity.

The wetting and dispersing agent (a2) is preferably selected so that it only has a few thickener-affine groups. For example, mono-functional wetting and dispersing agents (a2) can also be used advantageously with regard to the thickener-affine groups. If they contain not just one thickener-affine group, it is advantageous if the thickener-affine groups are arranged near to one another in space. The result of this is that they are unable to construct a markedly stabilizing network.

On the other hand, it is true that component (b1) counteracts the steric stabilization of the inorganic thickener (a1)

by the wetting and dispersing agent and enters into a very good to perfect interaction with the surface of the thickener.

In the following "Adhesion groups" table, only structural units that occur in various groupings in (a2) and (b1) are indicated as structural units that are included in the calculation of the proportion of adhesion groups in the wetting and dispersing agent (a2).

| "Adhesion groups" table | |
|---|---|
| Structural element | Grouping in (a2) or (b1) |
| C(O)N | Amide from secondary amines |
| C(O)NH | Amide from primary amines |
| C(O)NH$_2$ | Amide from ammonia |
| OH | Alcohol |
| N=C=N | Imidazoline |
| NC(O)N | Carbamide from secondary amines |
| HNC(O)NH | Carbamide from primary amines |
| NH$_2$ | Primary amine |
| NH | Secondary amine |
| N | Tertiary amine |
| XNH$_3$ | Ammonium salt from primary amines wherein X stands for the anion of an acid group |
| XNH$_2$ | Ammonium salt from secondary amines* |
| XNH | Ammonium salt from tertiary amines** |
| OP(O)(OH)2 | Organic phosphoric acid ester |
| C(O)OH | Carboxylic acid |

*Example: Ammonium carboxylate from secondary amine = COONH$_2$
**Example: Ammonium chloride from tertiary amine Amin = ClNH The calculation is typically made based on the starting compounds to be used for the synthesis of (a2) and (b1) and the structural elements to be expected from this, wherein a 100% reaction may be assumed or if the structure is known, the structural elements can be derived from the compounds.

A general selection criterion requires that wetting and dispersing agents (a2) have a significantly smaller percent by weight proportion of adhesion groups in relation to the total weight of the wetting and dispersing agent (a2) compared to component (b1) than is generally the case for the species of component (b1). In general, it has been found that the preferably applicable wetting and dispersing agents (a2) in this invention have a percent by weight proportion of structural elements of adhesion groups of preferably <11% by weight in relation to the total wetting and dispersing agent (a2), whereas in component (b1), the percent by weight proportion of structural elements of the adhesion groups is preferably ≥11% by weight.

These limits are not sharp but serve the targeted selection of the corresponding components. For especially preferred wetting and dispersing agents (a2), the above proportion of structural elements is <9% by weight, especially preferred <6% by weight, and most especially preferred <4% by weight, even <3% by weight, whereas for preferred components (b1) the above proportion of structural elements is preferably >13% by weight, especially preferred >20% by weight, most especially preferred even >30% by weight or even >40% by weight.

However, the proportion of structural elements in the wetting and dispersing agent (a2) should preferably not be less than 0.5% by weight and especially preferred not less than 0.8% by weight because otherwise the thickening-inhibiting effect is insufficient due to the lack of affinity to the surface of the thickener.

The difference of the weight percentage shares of structural elements in the wetting and dispersing agent (a2) with regard to the weight percentage share of structural elements in components (b1) is preferably at least 2% by weight, especially preferred at least 5% by weight, and most especially preferred at least 10% by weight.

Of course, the above calculations only include the wetting and dispersing agent (a2) and/or component (b1), in each instance without any solvent or other additives present that could be present because of the synthesis.

The following classification can apply as a general affinity sequence of various surface-affine groups for typical thickener surfaces:

[Group 1]: Imidazoline≥(amines, ammonium compounds)

[Group 2]: Alcohols≥(carbamides, amides, carboxylic acids, phosphoric acid esters), wherein the groups of Group 1 are in general more affine compared to the thickener surface of the inorganic thickener (a1) than those of Group 2, i.e. applies [Group 1]>[Group 2].

It generally applies that more affine groups are preferably present in component (b1), whereas the wetting and dispersing agents (a2) should preferably contain fewer affine groups.

It generally applies that the wetting and dispersing agent (a2) and component (b1) are selected so that they are selected from one or more of the following functional groups containing Group 1: consisting of
  imidazolyl groups containing the structural element N=C=N,
  amino groups containing the structural elements N for tertiary amines, NH for secondary amines and NH$_2$ for primary amines and
  ammonium groups containing the structural element NH$^+$X$^-$ for ammonium salts from tertiary amines, containing the structural element NH$_2^+$X$^-$ for ammonium salts from secondary amines and NH$_3^+$X$^-$ for ammonium salts from primary amines, wherein in each instance X$^-$ stands for the anion of an acid;
and/or
Group 2: consisting of
  hydroxyl groups containing the structural element OH,
  carbamide groups containing the structural element HNC(O)CNH for carbamides from primary amines and NC(O)CN for carbamide from secondary amines,
  amide groups containing the structural element C(O)N for amides from secondary amines, C(O)NH for amides from primary amines and C(O)NH$_2$ for amides from ammonia,
  carboxylic acid groups containing the structural element COOH and
  organic phosphoric acid ester groups containing the structural element OP(O)(OH)$_2$
and at the same time
(A) the weight percentage proportion of structural elements in the wetting and dispersing agent (a2), selected from the functional groups of Groups 1 and 2, in relation to the weight of the wetting and dispersing agent (a2) is lower than the weight percentage proportion of structural elements in component (b1), selected from the functional groups of Groups 1 and 2, in relation to the weight of component (b1); and/or
(B) component (b1) contains a higher weight percentage proportion of structural elements from the functional groups selected from Group 1, in relation to the weight of component (b1) than the wetting and dispersing agent (a2) of structural elements from the functional groups selected from Group 1, in relation to the weight of the wetting and dispersing agent (a2).

The rules of selection make it possible to reliable select suitable pairs of wetting and dispersing agents (a2), on the one hand, and components (b1), on the other. However, the extent of the viscosity increase by component (b1) depends on other factors, such as, for example, the structures of the wetting and dispersing agents (a2) and of component (b1), which, however, is only a question of the strength of the effect, but which does not jeopardize the practicability of the invention.

Frequently and in general, the extent of the viscosity increase can be increased by increasing the amount of component (b1) in relation to the wetting and dispersing agent (a2).

The weight ratio of the wetting and dispersing agent (a2) to component (b1) is preferably approx. 25:1 to 1:10, especially preferred 20:1 to 1:8, and most especially preferred 15:1 to 1:6.

Typically, for the ratio of (a2) to (b1), an excess of (a2) is used in relation to the weight the two components; i.e., (a2):(b1)=>1:1, especially preferred up to 15:1. If in such a case the increase in the thickening effect is insufficient, it is recommended to increase the amount of (b1) up to a typical ratio of (a2):(b1)=1:5. Of course, it is also possible to increase the amount of (b1) above this ratio. However, in the latter case it is recommended to use instead, if possible, a more potent component (b1), which has more and/or more thickener-affine groups.

Two- and Multi-component Systems

The present invention also relates to two- and multi-component systems, in particular aqueous or nonaqueous, preferably nonaqueous two- or multi-component systems, for example systems with three or more components. For the purposes of the invention, systems are referred to as non-aqueous systems that are essentially anhydrous, i.e., preferably those that contain less than 10% by weight, especially preferred 8% by weight and most especially preferred less than 5% by weight of water in relation to the total composition of the system.

The minimum requirement for a two- or multi-component system is that it comprises a component 1 that contains a module A, as defined above, and comprises a component 2 that comprises a module B, as defined above, and that at least one of components 1 and 2 or a component different from component 1 and component 2 contains one or more film-forming binding agents, wherein the one or more film-forming binding agents, if contained in component 1, are inert in relation to module A, and if contained in component 2, are inert in relation to module B.

In the context of this invention, the term "film-forming binding agent" does not mean that the binding agent is only capable of forming a "film" through any form of the transition from solid to liquid; rather, it comprises all geometric three-dimensional forms, for example strands and others, and thus not only films or layers. Film-forming binding agent can be categorized as physically drying binding agents that do not initiate any chemical reaction, chemical self-crosslinking binding agents that consequently contain groups that can react to one another, chemical non-self-crosslinking binding agents that react with a so-called "hardener" and binding agents that harden by means of actinic radiation, in particular those that harden through UV radiation or by means of electron radiation. There also exist binding agents that are capable of film forming via several mechanisms. For example, there are binding agents that contain both isocyanate groups and acrylate or methacrylate groups and thus can harden both with hydroxy-functional binding agents in the sense of a non-self-crosslinking and also by radiation, for example self-crosslinking or non-self-crosslinking with other ethylenically unsaturated compounds. Such cases are also called "dual-cure" hardening.

Film-forming by chemical crosslinking by reacting complementary reactive groups such as, for example, isocyanate and hydroxyl groups or epoxide and amino groups is also referred to herein as "thermal" crosslinking or "thermal" hardening (as opposed to actinic hardening and physical drying).

If, for example, an epoxide resin amine hardener system is used as a two-component system, an amine-functional component (b1), for example an unmodified or fatty acid salinized polyethylene imine can be added to the amine hardener component.

In one special embodiment of two- or multi-component systems, in which one of the components is an amine hardener component, an amine-functional component (b1) can not only partially or completely removes the inhibition of the thickener effect in the component containing module A but also acts itself as an amine hardener, for example towards epoxy resins or polyisocyanates. The carbamide groups formed then, for example by reaction with the polyisocyanates, can also be surface affine and in turn take part themselves in the displacement of the wetting and dispersing agent (a2) from the surface of the inorganic thickener (a1).

In the case of a polyol resin-polyisocyanate hardener two-component system, preferably an amine-functional component (b1) is not added to the hardener component, i.e. not to the polyisocyanate hardener component, because it can react with the polyisocyanate. In such a case, module B, containing component (b1), can, for example, be prepared in a third component, resulting in a three-component system from the two-component system. However, in another special embodiment, component (b1) can be added to the polyisocyanate component. This forms partial carbamide structures that in turn can act themselves as surface-affine groups. Examples of polyol resin-polyisocyanate systems in which the modules of the present invention can be used are found, for example, in the publications EP1366132B1, DE10162344A1, EP2441785A1 and WO2010/118949A2.

One preferred subject matter of the present invention are two- or multi-component systems comprising a component 1 that (i) comprises a thermal or actinic or thermal and actinic hardening binding agent, and (ii) comprises a module A according to the above definition that is inert in relation to the thermal or actinic or thermal and actinic hardening binding agent (i); and component 2, which (iii) comprises a compound reactive to component (i), and (iv) comprises a module B as defined above that is inert in relation to component 2 (iii).

In a preferred design of a two-component systems, component 1 comprises (i) a polyepoxy-functional binding agent and component 2 comprises (iii) a polyamine.

Suitable epoxide resins and amines for the epoxide resin-polyamine system described above are described, for example, in EP 0 835 910 A1, EP 2 085 426 A1 and EP 1141071 A1.

The subject matter of the present invention are also systems with three or more components comprising component 1, which (i) comprises a thermal or actinic or thermal and actinic hardening binding agent, as well as (ii) comprises a module A as defined above that is inert in relation to the thermal or actinic or thermal and actinic hardening binding agent (i); component 2, which comprises (iii) a compound reactive to component 1 (i), and component 3, which comprises (iv) a module B as defined above.

Especially preferred systems with three or more components are those wherein component 1 (i) comprises a polyhydroxy-functional binding agent and component 2 (iii) comprises a polyisocyanate; or component 1 (i) comprises an unsaturated polyester resin or an acrylate and/or methacrylate-functional component and component 2 (iii) comprises a peroxide. Unsaturated polyester resin systems are known, for example, from DE 2204106 B2. Suitable acrylate and/or methacrylate-functional components are known, for example, from EP 287516 B or EP 1347997 A1.

Systems with three or more components preferably are adhesives, sealants, coating agents or molding compounds.

Another special subject matter of the present invention is the module A described above comprising latent thickeners containing (a1) at least one inorganic thickener and (a2) at least one wetting and dispersing agent that inhibits the thickening effect of the inorganic thickener (a1). It is especially preferred if the latent thickener corresponds to module A. Therefore, every definition as well as general and special embodiments of module A apply to the latter.

According to the present invention, the latent thickener is a central element of the invention and the intermediate product for the manufacture of rheology control kits or systems with two, three or more components.

Thus, another subject matter of the present invention is the use of the latent thickener in a formulation inert in relation to the latent thickener in order to equip the formulation with a latent thickening effect. The formulation is preferably a component of a system with two or more components.

The two- or multi-component systems of the present invention are generally suitable for all substrates to be glued, coated or sealed. For example, suitable substrate materials include glass, metal and its alloys, plastics, including composites, painted surfaces, foils, paper and cardboard, wood, cement, concrete, textiles, for example fabrics or carpet materials, tile and many other materials.

The examples below describe the invention in detail.

EXAMPLES

Manufacturing Examples

In the case of molecularly nonuniform substances, the indicated molecular weights below—as in the above description—are average values of the number average. The molecular weights or number average molecular weights $M_n$ are calculated, if definable functional end groups such as hydroxy, NCO, amino or acid groups are present, by end-group determination by calculating the OH number, NCO number, amine number or acid number as a result of titration. In the case of compounds that cannot be calculated by end groups determination, the number average molecular weight is determined by means of gel permeation chromatography against a polystyrene standard. In the case of polyamines, indicated molecular weights number averages $M_n$ are determined by ebullioscopy.

Unless stated otherwise, indicated parts are parts by weight and indicated percentages are percentages by weight.

Viscosity Measurements

The viscosities of base components and of mixtures of base components were—unless indicated otherwise—measured on a Rheologica Stresstech device using the cone-and-plate method (cone diameter 25 mm; cone angle: 1°; split cone plate: 35 µm; temperature: 23° C.; shear rate 1 s$^{-1}$; number of measuring points: 21; compensation time 10 s; measuring time per measuring point: delay time+integration time; delay time: 5-8 s; integration time: 3 s; Standard strength (sensitivity): 60%).

The measurements on systems with two, three or more components were performed 2 minutes after their manufacture.

The viscosities of the base components and of the mixtures of base components were—to the extent the Brookfield is indicated—measured on a Brookfield-DV-II+Brookfield viscometer using the spindle method (spindle 3; 5rpm, temperature: 23° C.; measuring time per measuring point: 1 min). The measurements on systems with two, three or more components were performed 2 minutes after their manufacture.

Determining the Concentration of Tertiary Nitrogen

The concentration of tertiary nitrogen indicates the percentage concentration of bound tertiary basic nitrogen in a sample to be tested. The method of determination takes advantage of the fact that tertiary amino groups—in contrast to primary and secondary amino groups—do not react with anhydrides to amides. If primary and secondary amino groups are acylated with acetic acid anhydride, the tertiary amino groups can then be quantitatively titrated with perchloric acid. To determine the concentration of tertiary nitrogen of a sample, an amount to be tested of a sample is weighed out to precisely 0.1 mg in an 80mL-beaker on an analytical balance. The amount to be weighed of the amount to be tested is based on the expected concentration of tertiary nitrogen as indicated in the table below:

| Expected concentration of tertiary nitrogen [%] | Amount of sample to be weighed [g] |
| --- | --- |
| 0-0.3 | 3-5 |
| 0.3-0.6 | 1.5-3 |
| 0.6-0.9 | 1.0-1.5 |
| 0.9-1.5 | 0.6-1.0 |
| 1.5-2.0 | 0.45-0.6 |
| 2.0-3.0 | 0.30-0.45 |
| 3-5 | 0.15-0.30 |
| 5-10 | 0.08-0.15 |
| 10-20 | 0.06-0.08 |

The sample is dissolved in 20 mL acetic acid (99.8%) and 30 mL acetic acid anhydride (98.5%). The sample solution obtained in this manner is then covered with a tight-fitting lid for a period of 30 minutes at 70° C. in the thermoblock or water bath. After the sample solution cools, it is placed on a magnetic stirrer and a single-rod electrode is dipped into the sample solution. The single-rod electrode is part of a microprocessor-controlled analysis device (Titrator DL77, DL70 ES or DL67) manufactured by Mettler. The sample solution is titrated with perchloric acid (0.1 N in acetic acid, anhydride-free). The analysis device used determines the concentration of tertiary nitrogen. The concentration of tertiary nitrogen is calculated as follows:

Tertiary N-concentration (% by weight) =

$$\frac{\text{Consumption mL} \times N \times f \times 1.4008}{\text{Weight in g}}$$

N=Normality of the means of titration
f=Factor of the means of titration
If necessary, the factor f takes into account the deviation of the means of titration used from a normality of 0.1 N.

Inorganic Thickeners (a1)

Used as inorganic thickeners were two different types of commercially available pyrogenic silicic acid (sold by Evonik Industries) that differ in their BET surface, namely:
(a1.1)=Aerosil® 200 (BET 200) and
(a1.2)=Aerosil® 380 (BET 380).

In addition, three different mixtures of modified layered silicate sold by Byk Chemie GmbH under the brand name Garamite® were used, namely:
(a1.3)=Garamite® 7305 (with quaternary ammonium compounds modified mixture of various bentonites)
(a1.4)=Garamite® 1210 (with quaternary ammonium compounds modified mixture of various bentonites) and
(a1.5)=Garamite® 1958 (with quaternary ammonium compounds modified mixture of various bentonites)

Wetting and Dispersing Agents (a2)
Manufacture of (a2.1)
Preliminary Stage A 30 g of Epomin SP-018 (Nippon Shokubai) are heated to 80° C. Over a period of two hours, 70 g of 2-ethylhexyl acrylate are added, then are left to react for six hours.

Preliminary Stage B

92% polyether (butanol-started EO/PO polyether (approx. 1:1), Mw approx. 1,100 Da) is heated to 60° C. 7.6 g of polyphosphoric acid are added slowly. The reaction mixture is stirred for six hours until the acid value (acid value according to DIN EN ISO 2114) in the flask increases no further.

Synthesis of the Compound from Preliminary Stages A and B 20 g of the preliminary stage A are presented at 60° C. and 80 g of preliminary stage B are slowly added over a period of two hours. The reaction mixture is stirred for five hours at 60° C.

The product obtained has an active substance concentration of 100%.

Manufacture of (a2.2)

In a reaction vessel, 205 g of tetrahydrofuran are added and 0.11 mL of 1M tetrabutyl ammonium-3-chlorobenzoate in acetonitrile and 1.94 g 1-methoxy-1-trimethylsiloxy-2-methyl propane are added. The reaction vessel was cooled to -10° C. Parallel to adding over 40 minutes a mixture consisting of 39.6 g 2-ethylhexyl methacrylate, 20 g methyl methacrylate and 2.84 g butyl methacrylate a partial solution of 0.22 mL 1 M tetrabutyl ammonium-3-chlorobenzoate into acetonitrile 5 mL tetrahydrofuran was fed over a period of one hour. The reaction temperature never exceeds a temperature of 25° C. Then, 20.9 g N,N-dimethyl aminoethyl methacrylate are added over a period of 10 minutes; at the same time, an additional 0.11 mL of tetrabutyl ammonium-3-chlorobenzoate in acetonitrile over a period of 10 minutes. After an additional stirring of three hours at room temperature (23° C.) 5 mL methanol were added. After adding 6.7 g benzyl chloride, it is stirred for an additional six hours at 60° C.

Then, methoxy propyl acetate is added to the product and the tetrahydrofuran contained within it is distilled off; the proportion of non-volatile proportions (2.0±0.1 g test substance, repeat determination, 10 minutes, 150° C.; EN ISO 3251) is adjusted by 40%.

Manufacture of (a2.3)
Preliminary Stage A 100 g dimethylol propionic acid (manufactured by Perstorp), 255.26 g ε-caprolactone and 74.64 g δ-valerolactone were mixed with dibutyl tin dilaurate (200 ppm) and under protective gas stirred at 170° C. until the proportion of non-volatile shares (2.0±0.1 g test substance, repeat determination, 10 minutes, 150° C.; EN ISO 3251) exceeds a value of 98%.

Preliminary Stage B 435 g Desmodur T100 (manufactured by Bayer) is placed under nitrogen and 1,100 g of the dry (water content according to Karl Fischer <0.1%) polyether (butanol-started PO-polyether, Mw approx. 1,100 Da) is added slowly, so that the reaction temperature does not exceed 60° C. After it is added, it is stirred at 60° C. until the NCO number of the product does not change significantly after a period of 30 minutes.

The remaining excess of Desmodur T100 is then removed by distillation by the use of a thin-film or short-path evaporator.

Synthesis of the Compound from Preliminary Stages A and B 1.2 g Epomin SP200 (manufactured by Nippon Shokubai) are heated under nitrogen to 180° C. together with 59.0 g preliminary stage A. The formulation was stirred at this temperature until the acid number (acid number according to DIN 53402) reached a value of 8.4 mg KOH per g substance. During the reaction, the reaction water formed was distilled off at the selected reaction temperature and caught in a water separator. Then, the hydroxyl number (according to DIN/ISO 4629) of the resulting product was determined and 50% of the hydroxy groups was converted at a temperature of 60° C. by adding preliminary stage B and stirring under nitrogen for four hours.

The product obtained is a highly viscous, brown oil; the active substance concentration is 100%.

Manufacture of (a2.4)
Preliminary Stage A 100 g dimethylol propionic acid (manufactured by Perstorp), 255.26 g ε-caprolactone and 74.64 g δ-valerolactone were mixed with dibutyl tin laurate (200 ppm) and under protective gas stirred at 170° C. until the proportion of non-volatile shares (2.0±0.1 g test substance, repeat determination, 10 minutes, 150° C.; EN ISO 3251) exceeds a value of 98%.

Preliminary Stage B 435 g Desmodur T100 (manufactured by Bayer) is placed under nitrogen and 1,100 g of the dry (water content according to Karl Fischer <0.1%) polyether (butanol-started PO-polyether, Mw approx. 1,100 Da) is added slowly, so that the reaction temperature does not exceed 60° C. After it is added, it is stirred at 60° C. until the NCO number of the product does not change significantly after a period of 30 minutes.

The remaining excess of Desmodur T100 is then removed by distillation by the use of a thin-film or short-path evaporator.

Synthesis of the Compound from Preliminary Stages A and B 1.2 g Epomin SP200 (manufactured by Nippon Shokubai) are heated under nitrogen to 180° C. together with 59.0 g preliminary stage A. The formulation was stirred at this temperature until the acid number (acid number according to DIN 53402) reached a value of 7.8 mg KOH per g substance. During the reaction, the reaction water created was distilled off at the selected reaction temperature and caught in a water separator. Then, the hydroxyl number (according to DIN/ISO 4629) of the resulting product was determined and 50% of the hydroxy groups was converted at a temperature of 60° C. by adding preliminary stage B and stirring under nitrogen for four hours.

The product obtained was then dissolved in 80% methoxy propyl acetate for further use.

Manufacture of (a2.5)

Preliminary Stage A 134 g dimethylol propionic acid (manufactured by Perstorp), 342 g ε-caprolactone and 100 g δ-valerolactone were mixed with dibutyl tin laurate (200 ppm) and under protective gas stirred at 170° C. until the proportion of non-volatile shares (2.0±0.1 g test substance, repeat determination, 10 minutes, 150° C.; EN ISO 3251) exceeds a value of 98%.

Preliminary Stage B 435 g Desmodur T100 (manufactured by Bayer) is placed under nitrogen and 1,100 g of the dry (water content according to Karl Fischer <0.1%) polyether (butanol-started PO-polyether, Mw approx. 1,100 Da) is added slowly, so that the reaction temperature does not exceed 60° C. After it is added, it is stirred at 60° C. until the NCO number of the product does not change significantly after a period of 30 minutes.

The remaining excess of Desmodur T100 is then removed by distillation by the use of a thin-film or short-path evaporator.

Synthesis of the Compound from Preliminary Stages A and B 10 g Epomin SP200 (manufactured by Nippon Shokubai) are heated under nitrogen to 180° C. together with 550 g preliminary stage A. The formulation was stirred at this temperature until the acid number (acid number according to DIN 53402) reached a value of 10.3 mg KOH per g substance. During the reaction, the reaction water created was distilled off at the selected reaction temperature and caught in a water separator. Then, the hydroxyl number (according to DIN/ISO 4629) of the resulting product was determined and 50% of the hydroxy groups was converted at a temperature of 60° C. by adding preliminary stage B and stirring under nitrogen for four hours.

The product obtained was then dissolved in 80% benzyl alcohol for further use.

Manufacture of (a2.6)

250 g polyether (methanol-started EO-polyether, Mw approx. 500 Da) are mixed with 181 g ε-caprolactone and heated to 80° C. Then, 1,000 ppm toluene sulfonic acid are added. The reaction mixture is stirred until the proportion of non-volatile shares (2.0±0.1 g test substance, repeat determination, 10 minutes, 150° C.; EN ISO 3251) exceeds a value of 98%. Then, 650 ppm dibutyl ethanol amine are added and reaction mixture is stirred for an additional 10 minutes.

51 g polyphosphoric acid are added. The reaction mixture is stirred for three hours until the acid number (acid number according to DIN EN ISO 2114) in the flask increases no further. Then, 5 g water, 900 g methoxy propyl acetate and 19 g magnesium oxide are added and the reaction mixture is homogenized for one hour at 100° C. Excess water is removed in a vacuum until the water content according to Karl-Fischer (according to DIN 51777) reaches a value <0.2%.

Then, the concentration of active substance is adjusted to a value of 40% by determining the proportion of non-volatile shares (2.0±0.1 g test substance, repeat determination, 10 minutes, 150° C.; EN ISO 3251).

Manufacture of (a2.7)

30 g Epomin SP-018 (manufactured by Nippon Shokubai) are heated to 80° C. Over a period of two hours, 70 g 2-ethylhexylacrylate are added, then left to react for six hours.

The product obtained has an active substance concentration of 100%.

Manufacture of (a2.8)

65 g synthetic resin SMA 2000 (styrene maleic acid hydride copolymer, 187 mmol anhydride groups, manufactured by Cray Valley) are dissolved in 100 g methoxy propyl acetate and slowly added to a mixture of 105 g Jeffamin M2070 (amine-terminated EO/PO polyether, manufactured by Huntsman) and 10.2 g N,N-dimethyl amino propyl amine and heated to 170° C. for four hours. During this time, the methoxy propyl acetate contained is distilled off. Then, 8.9 g benzyl chloride is added at 70° C. and reacted for eight hours.

The obtained product is added to a mixture of methoxy propyl acetate and butyl glycol (ratio 1:1, weighted) until the active substance concentration is 40%.

Manufacture of (a2.9)

65 g synthetic resin SMA 2000 (styrene maleic acid hydride copolymer, 187 mmol anhydride groups, manufactured by Cray Valley) are dissolved in 100 g methoxy propyl acetate and slowly added to a mixture of 105 g Jeffamin M2070 (amine-terminated EO/PO polyether, manufactured by Huntsman) and 10.2 g N,N-dimethyl amino propyl amine and heated to 170° C. for four hours. During this time, the methoxy propyl acetate contained is distilled off.

The obtained product is added to a mixture of methoxy propyl acetate and butyl glycol (ratio 1:1, weighted) until the active substance concentration is 40%.

Manufacture of (a2.10)

Preliminary Stage A 205 g tetrahydrofuran are placed in a reaction vessel and 0.11 mL 1M tetrabutylammonium-3-chlorobenzoate in acetonitrile and 1.94 g 1-methoxy-1-trimethylsiloxy-2-methylpropane are added. The reaction vessel was cooled to –10° C. Parallel to the addition over 40 minutes of a mixture consisting of 39.6 g 2-ethylhexylmethacrylate, 20 g methylmethacrylate and 2.84 g butylmethacrylate, over a period of one hour a solution of 0.22 mL 1M tetrabutylammonium-3-chlorobenzoate in acetonitrile was added to 5 mL tetrahydrofuran. The reaction temperature never exceeded 25° C. Then, 20.9 g N,N-dimethyl aminoethyl methacrylate was added over a period of 10 minutes; at the same time, an additional 0.11 mL 1M tetrabutylammonium-3-chlorobenzoate in acetonitrile was added over a period of 10 minutes.

After an additional three hours of stirring at room temperature (23° C.), 5 mL methanol were added.

Preliminary Stage B 87g polyether (butanol-started PO-polyether, Mw approx. 700 Da) are heated 60° C. 13 g polyphosphoric acid are slowly added. The reaction mixture is stirred for six hours until the acid number (acid number according to DIN EN ISO 2114) in the flask increases no further.

Synthesis of the Compound from Preliminary Stages A and B 120 g preliminary stage A are mixed with 50 g polyether (methanol-started EO-polyether, Mw approx. 350) and the obtained solvent is distilled off in a vacuum. Then, the mixture is heated to 60° C. and 14 g of preliminary stage B are added and stirred at this temperature for eight hours.

The product obtained has an active substance concentration of 50%.

Manufacture of (a2.11)

15.2 g alpha-methylstyrene-dimer are placed in 120 g methoxy propyl acetate and heated to 120° C. 100 g dimethylaminoethyl methacrylate and 1.5 g AIBN dissolved in 10 g methoxy propyl acetate are added in parallel over a period of 60 minutes, then left to react for 30 minutes. Now, a mixture of 60 g methylmethacrylate, 20 g 2-ethylhexyl-methacrylate, 50 g 2-ethylhexylacrylate and 230 g butyl acrylate are added in parallel to a solution of 37.2 g AIBN in 240 g methoxy propyl acetate over a period of 150 minutes, then left to react for 30 minutes.

Then, 100 g dimethylaminoethyl methacrylate and 1.2 g AIBN dissolved in 10 g methoxy propyl acetate are added at the same time over a period of 60 minutes, then left to react for 30 minutes.

After a further addition of 0.4 g AIBN dissolved in 5 g methoxy propyl acetate over a period of 15 minutes, the mixture is left to react for 60 minutes.

The product obtained has an active substance concentration of 60%.

Manufacture of (a2.12)
Preliminary Stage A 15 g tall oil fatty acid (acid number: 186 mg KOH per g substance) and 10 g polyethylene glycol 200 are slowly heated together to 200° C. until any water that has formed can no longer be caught. A vacuum (beginning at normal pressure, slowly dropping to 60 mbar) is applied for 2 hours. Then, 4 g maleic acid anhydride are added and the mixture is left to react for one hour at 200° C.

Preliminary Stage B 17 g tall oil fatty acid (acid number: 186 mg KOH/g substance) and 3.0 g diethylenetriamine are added together heated to 170° C. for four hours. Any reaction water is distilled off and the mixture is stirred for an additional two hours in a vacuum (60 mbar).

Then, 2 g water are added and stirred for 30 minutes at 95° C. until the concentration of tertiary nitrogen (see method description) can no longer be ascertained. Then, a vacuum (60 mbar) is reapplied and excess water is distilled off until the water content according to Karl-Fischer (according to DIN 51777) reaches a value of <0.4%.

Synthesis of the Compound from Preliminary Stages A and B 25 g preliminary stage A and 20 g preliminary stage B are homogenously stirred together with 45 g Isopar G (hydrogenated C10-C12 isoalkanes, <2% aromatic compound concentration) for one hour at 80° C.

The product obtained has an active substance concentration of 50%.

Manufacture of (a2.13)
Preliminary Stage A 88 g Lutensol AO11 (fatty alcohol-started EO-polyether manufactured by BASF SE) are mixed with 0.05 g potassium carbonate and heated to 100° C. Then, 12 g maleic acid anhydride are added and stirred at this temperature for three hours.

Preliminary Stage B 270 g methoxy propyl acetate and 18 g alpha methylstyrene are heated to 120° C. At the same time, 300 g butylmethacrylate and a solution of 7.2 g AIBN in 40.8 g methoxy propyl acetate are added over a period of two hours. After 30 minutes post-reaction time, in parallel 163 g N,N-dimethylaminoethyl methacrylate and a solution of 1.43 g AIBN in 8.2 g methoxy propyl acetate are added over a period of one hour. After 30 minutes post-reaction time, a solution of 1.4 g AIBN in 8 g methoxy propyl acetate is added over a period of 15 minutes and stirred for an additional one hour.

Synthesis of the Compound from Preliminary Stages A and B 40 g preliminary stage B, 20 g preliminary stage A and 13.3 g methoxy propyl acetate are stirred together for five hours at 120° C.

The product obtained has an active substance concentration of 60%.

Manufacture of (a2.14)
Preliminary Stage A 100 g dimethylol propionic acid (manufactured by Perstorp), 255.26 g ε-caprolactone and 74.64 g δ-valerolactone were mixed with dibutyl tin dilaurate (200 ppm) and under protective gas stirred at 170° C. until the proportion of non-volatile shares (2.0±0.1 g test substance, repeat determination, 10 minutes, 150° C.; EN ISO 3251) exceeds a value of 98%.

Preliminary Stage B 435 g Desmodur T100 (manufactured by Bayer) is placed under nitrogen and 1,100 g of the dry (water content according to Karl Fischer <0.1%) polyether (butanol-started PO-polyether, Mw approx. 1,100 Da) is added slowly, so that the reaction temperature does not exceed 60° C. After it is added, it is stirred at 60° C. until the NCO number of the product does not change significantly after a period of 30 minutes.

The remaining excess of Desmodur T100 is then removed by distillation by the use of a thin-film or short-path evaporator.

Synthesis of the Compound from Preliminary Stages A and B 1.2 g Epomin SP200 (manufactured by Nippon Shokubai) are heated under nitrogen to 180° C. together with 59.0 g preliminary stage A. The formulation was stirred at this temperature until the acid number (acid number according to DIN 53402) reached a value of 9.6 mg KOH per g substance. During the reaction, the reaction water created was distilled off at the selected reaction temperature and caught in a water separator. Then, the hydroxyl number (according to DIN/ISO 4629) of the resulting product was determined and 50% of the hydroxy groups was converted at a temperature of 60° C. by adding preliminary stage B and stirring under nitrogen for four hours. The product obtained was then dissolved in 80% benzyl alcohol for further use.

Component (b1)
Manufacture of (b1.1)

881 g of a mixture of polymerized fatty acids with greater than 75% by weight of trimerized fatty acid, in each instance in relation to the total weight of the mixture, having an acid number of 191 mg KOH/g substance (Pripol 1040, manufactured by Croda), are mixed with 438 g trimethylene tetramine (CAS-No.: 112-24-3) and 400 mL Solvent Naphtha (aromatic hydrocarbon fraction, boiling range from 150° C. to 210° C.) and heated to 150° C. until the flow of distillate diminishes significantly. Then, the mixture is heated to 190° C. for 6 hours and a vacuum (approx. 500 mbar) is applied until a total of 108 g water is eliminated.

The product obtained is mixed with benzyl alcohol until a proportion of non-volatile shares (2.0±0.1 g test substance, repeat determination, 20 minutes, 150° C.; EN ISO 3251) of 70-75% by weight is obtained.

Manufacture of (b1.2)

400 g Lupasol P (50% polyethylene imine manufactured by BASF SE) are mixed with 600 g benzyl alcohol and distilled at 100° C. and vacuum (slow dropping of the pressure from normal pressure to 30 mbar) released from the water until there is no more distillate. Then, under a protective gas atmosphere, 200 g tall oil fatty acid (acid number: 186 mg KOH/g substance) are added and reacted for three hours at 140° C.

A pale yellow product having an active substance concentration of 40% is obtained.

Manufacture of (b1.3)

According to printed patent specification DE3706860A1, Example 8, which is mentioned therein, is synthesized. Contrary to the instruction therein, it is not dissolved in 50%-cyclohexanone; rather in 50% Solvent Naphtha (aromatic hydrocarbon fraction, boiling range from 150° C. to 210° C.).

Manufacture of (b1.4)

800 g Lupasol P (50% polyethylene imine manufactured by BASF SE) are mixed with 400 g benzyl alcohol and distilled at 100° C. and vacuum (slow dropping of the pressure from normal pressure to 30 mbar) released from the water until there is no more distillate. Then, under a protective gas atmosphere, 200 g tall oil fatty acid (acid number: 186 mg KOH/g substance) are added and reacted for three hours at 140° C.

A pale yellow product having an active substance concentration of 60% is obtained.

Manufacture of (b1.5)

600 g Lupasol P (50% polyethylene imine manufactured by BASF SE) are mixed with 300 g benzyl alcohol and distilled at 100° C. and vacuum (slow dropping of the pressure from normal pressure to 30 mbar) released from the water until there is no more distillate. Then, under a protective gas atmosphere, 120 g tall oil fatty acid (acid number: 186 mg KOH/g substance) are added and reacted for three hours at 140° C.

A pale yellow product having an active substance concentration of 58% is obtained.

The Following Components (b1.x) are Sold Commercially:

Component (b1.6)

Lupasol P, polyethylene imine manufactured by BASF SE, Mw approx. 750,000 Da (active substance concentration: 50% by weight)

Component (b1.7)

Tween 20, polyoxyethylene (20)-sorbitan-monolaurate

Component (b1.8)

Triethylene tetramine

Component (b1.9)

Isophorone diamine, isomer mixture

Component (b1.10)

Diglycol amine

Component (b1.11)

Jeffamine T-403, polyether amine manufactured by Huntsman

Examples of Use

The following describes the manufacture of two-component systems according to the invention that are obtained in each instance from two base components by mixing as described below. Unless indicated otherwise, both the commercial products and inorganic thickeners (a1.x), the wetting and dispersing agents (a2.x) and components (b1.x) are used in the same way as a commercial product or product of synthesis. Therefore, the amounts indicated (in g) refer to the respective commercial products or products of synthesis, including any solvents present and/or additives that were not removed for production-related reasons.

List of Commercial Products used in the Examples of use

EPON Resin 828: Epoxy-binding agent based on bisphenol A/epichlorohydrin manufactured by Momentive.

EPIKOTE Resin 1001X75: 75% solid resin solution in xylene of a solid epoxy-binding agent based on bisphenol A/epichlorohydrin manufactured by Momentive.

Epikure 8545-W-52 nonionic, water-reducible modified amine adduct manufactured by Momentive.

Epikote 816 MV Bisphenol A resin in a monofunctional reactive diluent manufactured by Momentive.

HELOXY™ Modifier HD: Reactive diluent based on hexane-1,6 diol diglycidyl ether, manufactured by Momentive.

HELOXY™ Modifier BD: Reactive diluent based on butane-1,4-diol diglycidyl ether, manufactured by Momentive.

HELOXY™ Modifier Z8: Reactive diluent based on a monofunctional aliphatic glycidyl ether based on a C12/C14 fatty alcohol manufactured by Momentive.

BYK(B)-A 530: Bleeding device containing 95% silicone and polymer, manufactured by BYK-Chemie GmbH.

BYK-LP D 22185: Bleeding device containing 95% silicone and polymer in reactive solution, manufactured by BYK-Chemie GmbH.

BYK-9076: Solvent-free wetting and dispersing additive for stabilizing organic and inorganic pigments, manufactured by BYK-Chemie GmbH.

CeTePox 1393-02 H: Amine hardener for epoxide systems, manufactured by CTP GmbH, mixture of isophorone diamine, m-xylylene diamine, benzyl alcohol, salicylic acid and nonyl phenol, H-equivalent: 93).

CeTePox 240 R: Epoxy-binding agent based on bisphenol A/bisphenol F epichlorohydrin, manufactured by CTP GmbH.

Jeffamine XTJ 568: Amine hardener (monoethylene glycol polybutylene oxide diamine, H-equivalent: 55) for epoxide systems, manufactured by Huntsman.

EPIKURE 934: Amine hardener (m-xylylene diamine, H-equivalent: 34) for epoxide systems, manufactured by Momentive.

EPIKURE 3155: Amine hardener for epoxide systems, manufactured by Momentive, reaction product (modified polyamide based on dimerized fatty acid and polyamines, H-equivalent: 133.

Dowanol PM: Monopropylene glycol monomethyl ether manufactured by Dow Chemical Company.

Bayferrox 130M: Iron oxide red pigment manufactured by Lanxess Deutschland GmbH.

Micro TalkAT 1: Micronized talc manufactured by Norwegian Talk Deutschland GmbH.

Heucophos ZPA: Zinc aluminum orthophosphate hydrate manufactured by Heubach GmbH.

EWO: Barite manufactured by Sachtleben Chemie GmbH.

Setathane D 1150: Solvent-free, liquid branched polyol based on castor oil, manufactured by Nuplex.

Setathane D 1145: Solvent-free, liquid branched polyol based on castor oil, manufactured by Nuplex.

Desmodur VL: Aromatic polyisocyanate based on diphenyl methane diisocyanate, manufactured by Bayer.

BYK®-088: Bleeding device containing silicone and polymer manufactured by BYK-Chemie GmbH.

Bayferrox 318M: Micronized iron oxide black pigment manufactured by Lanxess Deutschland GmbH.

MOLSIV: UOP L-paste, preparation consisting of 50% castor oil and 50% L-powder, manufactured by UOP, Sari, Switzerland.

Palatal P 4: Unsaturated polyester resin based on orthophtalic acid and standard glycols, dissolved in styrene, manufactured by DSM.

Palatal A 400: Unsaturated polyester resin based on isophthalic acid and standard glycols, dissolved in styrene, manufactured by DSM.

Palatal A 410: Unsaturated polyester resin based on isophthalic acid and neopentyl glycol, dissolved in styrene, manufactured by DSM.

COR 61-219-655: Unsaturated polyester resin based on DCPD, dissolved in styrene, manufactured by Interplastic.

MEKP ButanoxR M 50: Hardener based on methyl ethyl ketone peroxide (MEKP), dissolved in dimethyl phthalate, manufactured by Akzo Nobel.

Accelerator NL-51 P: Accelerator based on cobalt (II) 2-ethylhexanoate, 6% Co, in liquid mixture, manufactured by Akzo Nobel.

Accelerator NL-49P: Accelerator based on cobalt (II) 2-ethylhexanoate, 1% Co, in liquid mixture, manufactured by Akzo Nobel.

BYK®-A 555: Bleeding device containing polymer, manufactured by BYK-Chemie GmbH.

RKB 2: A micronized rutile-titanium dioxide pigment treated with clay and silicate compounds, manufactured by Sachtleben Chemie GmbH.

Apyral 1 E: Mineral flame retardant manufactured by NabaltecAG.

$TiO_2$ paste (50% by weight $TiO_2$): 50% $TiO_2$ (Tronox RKB2) in Palatal A400 (grinding conditions: dissolver, 20 minutes, 5,000 rpm).

Degalan 51/03: Polymethacrylate-based polymer microspheres manufactured by Evonik Röhm GmbH.

Peroxan BP powder 50 W+: Reaction initiator dibenzoyl peroxide; 50%, powder with dicyclohexyl phthalate, manufactured by Pergan GmbH.

Pergaquick A 150: N,N-di-(2-hydroxy-ethyl)-p-toluidine, 98%, liquid; is used as an accelerator for the hardening of unsaturated polyester and PMMA resins at ambient temperature in combination with dibenzoyl peroxide (PEROXAN BP types), manufactured by Pergan GmbH.

MMA: CAS 80-62-6, methacrylic acid methyl ester (methyl methacrylate).

BYK®-A 515: Bleeding device containing polymer, manufactured by BYK-Chemie GmbH.

PMMA Syrup 53/01: 20 g Degalan 51/03 and 80 g MMA are stirred in a vessel at room temperature (23° C.) until all Degalan 51/03 is dissolved.

Nonaoueous Epoxy Resin/Amine Hardener Systems
Manufacture of Base Components SK.A through SK.H and SK.J The individual components are added one after the other in the amounts indicated in Tables 1 through 6 while stirring at room temperature (23° C.) with the dissolver Pendraulik TD 100 with a serrated disk at 2 m/s and then for homogenization stirred for an additional 1 minute at 5 m/s, 1 minute at 10 m/s, and 1 minute at 15 m/s.

Manufacture of Base Component SK.I

Epikote 1001 X 75, xylene, Dowanol PM, BYK-A 530 and BYK-9076 are mixed by stirring one minute by hand, then the remaining components (see Table 12) are added and homogenized with the dissolver Pendraulik TD 100 with a serrated disk at 12 m/s for 10 minutes.

Description of the Unfinished Goods by Combining Base Components SK.A and SK.B, SK.C and SK.D. SK.E and SK.F. SK.G and SK.H, as well as SK.I and SK.J:

The two base components SK.A and SK.B (or SK.C and SK.D; SK.E and SK.F; SK.G and SK.H; as well as SK.I and SK.J) are mixed together and homogenized with the dissolver Pendraulik TD 100 with a serrated disk at 2 m/s for 1 minute.

The viscosities indicated in Table 7 were measured for the individual base components after cooling to room temperature (23° C.). The viscosities of the multi-component mixtures mixed from the base components were measured 2 minutes after their manufacture.

TABLE 1

| | Comparative example V1 | | Comparative example V2 | | Comparative example V3 | |
|---|---|---|---|---|---|---|
| Components | SK.A | SK.B | SK.A | SK.B | SK.A | SK.B |
| EPON Resin 828 | 75.6 | | 75.6 | | 75.6 | |
| HELOXY Modifier HD | 18.9 | | 18.9 | | 18.9 | |
| BYK-A 530 | 0.5 | | 0.5 | | 0.5 | |
| Module A (a1.1) | 5.0 | | 5.0 | | 5.0 | |
| (a2.2) | 0.0 | | 0.0 | | 3.0 | |
| CeTePox 1393-02 H | | 49.2 | | 49.2 | | 49.2 |
| Module B (b1.1) | | 0.0 | | 1.0 | | 1.5 |

TABLE 2

(amounts indicated in g)

| | Example 1 | | Example 2 | | Example 3 | | Example 4 | | Example 5 | |
|---|---|---|---|---|---|---|---|---|---|---|
| Components | SK.A | SK.B | SK.A | SK.B | SK.A | SK.B | SK.A | SK.B | SK.A | SK.B |
| EPON Resin 828 | 75.6 | | 75.6 | | 75.6 | | 75.6 | | 75.6 | |
| HELOXY Modifier HD | 18.9 | | 18.9 | | 18.9 | | 18.9 | | 18.9 | |
| BYK-A 530 | | 0.5 | | 0.5 | | 0.5 | | 0.5 | | 0.5 |
| Module A (a1.1) | 5.0 | | 5.0 | | 5.0 | | 5.0 | | 5.0 | |
| (a2.x) | $3.0^1$ | | $3.0^2$ | | $3.0^3$ | | $3.0^4$ | | $3.0^5$ | |
| CeTePox 1393-02 H | | 49.2 | | 49.2 | | 49.2 | | 49.2 | | 49.2 |
| Module B (b1.x) | | 1.5* | | 1.0** | | 1.0** | | 1.0** | | 1.0** |

$^1$ = (a2.4);
$^2$ = (a2.8);
$^3$ = (a2.1);
$^4$ = (a2.13);
$^5$ = (a2.14);
* = (b1.1);
** = (b1.5)

TABLE 3

(amounts indicated in g)

| Components | Example 6 SK.C | Example 6 SK.D | Example 7 SK.C | Example 7 SK.D | Example 8 SK.C | Example 8 SK.D | Example 9 SK.C | Example 9 SK.D |
|---|---|---|---|---|---|---|---|---|
| CeTePox 240 R | 80.32 | | 80.32 | | 80.32 | | 80.32 | |
| HELOXY Modifier HD | 14.18 | | 14.18 | | 14.18 | | 14.18 | |
| BYK-A 530 | 0.5 | | 0.5 | | 0.5 | | 0.5 | |
| Module A (a1.2) | 5.0 | | 5.0 | | 5.0 | | 5.0 | |
| (a2.x) | 5.0[1] | | 5.0[1] | | 3.0[2] | | 5.0[3] | |
| CeTePox 1393-02 H | | 51.85 | | 51.85 | | 51.85 | | 51.85 |
| Module B (b1.x) | | 0.5** | | 1.5* | | 0.5** | | 0.5** |

[1] = (a2.14);
[2] = (a2.1);
[3] = (a2.4);
* = (b1.1);
** = (b1.5)

TABLE 4

(amounts indicated in g)

| | Example 10 | |
|---|---|---|
| Components | SK.E | SK.F |
| CeTePox 240 R | 80.32 | |
| BYK-LP D 22185 | 0.5 | |
| Module A (a1.3) | 5.0 | |
| (a2.8) | 1.0 | |
| m-xylene diamine | | 17.99 |
| Module B (b1.5) | | 0.5 |

TABLE 5

(amounts indicated in g)

| | Example 11 | |
|---|---|---|
| Components | SK.G | SK.H |
| EPON Resin 828 | 77.01 | |
| HELOXY Modifier Z8 | 13.58 | |
| BYK-LP D 22185 | 0.49 | |
| Module A (a1.1) | 6.86 | |
| (a1.3) | 2.06 | |
| (a2.14) | 6.0 | |
| Jeffamine XTJ 568 | | 25.41 |
| Module B (b1.5) | | 1.0 |

TABLE 6

(amounts indicated in g)

| | Example 12 | | Example 13 | |
|---|---|---|---|---|
| Components | SK.I | SK.J | SK.I | SK.J |
| Epikote 1001 X 75 | 31.08 | | 31.08 | |
| BYK-A 530 | 0.50 | | 0.50 | |
| BYK-9076 | 0.85 | | 0.85 | |
| Xylene | 8.11 | | 8.11 | |
| Dowanol PM | 6.76 | | 6.76 | |
| Bayferrox 130 M | 4.70 | | 4.70 | |
| Micro TalkAT 1 | 12.00 | | 12.00 | |
| Heucophos ZPA | 20.00 | | 20.00 | |
| EWO | 14.00 | | 14.00 | |
| module A (a1.1) | 2.0 | | 2.0 | |
| (a2.x) | 1.2[1] | | 1.2[2] | |
| Epikure 3155 | | 8.68 | | 8.68 |
| Module B (b1.5) | | 0.2 | | 0.2 |

[1] = (a2.4);
[2] = (a2.14)

TABLE 7

| Comparative example | Viscosity* SK.A without (a2.x) | Viscosity* SK.A | Viscosity loss in % | Viscosity* SK.B | Viscosity* SK.A + SK.B | Viscosity increase[1] in % |
|---|---|---|---|---|---|---|
| 1 | 201 | ./. | ./. | 0.3 | 2.5 | ./. |
| 2 | 201 | ./. | ./. | 0.3 | 119 | ./. |
| 3 | 201 | 4.1 | 98 | 0.3 | 2.3 | −44 |

| Example | Viscosity* SK.A without (a2.x) | Viscosity* SK.A | Viscosity loss in % | Viscosity* SK.B | Viscosity* SK.A + SK.B | Viscosity increase[1] in % |
|---|---|---|---|---|---|---|
| 1 | 201 | 22 | 89 | 0.3 | 124 | 464 |
| 2 | 201 | 2.2 | 99 | 0.3 | 153 | 6,855 |

TABLE 7-continued

| | | | | | | |
|---|---|---|---|---|---|---|
| 3 | 201 | 2.6 | 99 | 0.3 | 195 | 7,400 |
| 4 | 201 | 5.5 | 97 | 0.3 | 146 | 2,555 |
| 5 | 201 | 9.3 | 95 | 0.3 | 191 | 1,954 |

| Example | Viscosity* SK.C without (a2.x) | Viscosity* SK.C | Viscosity loss in % | Viscosity* SK.D | Viscosity* SK.C + SK.D | Viscosity increase[2] in % |
|---|---|---|---|---|---|---|
| 6 | 294 | 8.7 | 97 | 0.3 | 171 | 1,866 |
| 7 | 294 | 8.7 | 97 | 0.3 | 89 | 923 |
| 8 | 294 | 4.1 | 98 | 0.3 | 191 | 4,558 |
| 9 | 294 | 98.6 | 66 | 0.3 | 161 | 68 |

| Example | Viscosity* SK.E without (a2.x) | Viscosity* SK.E | Viscosity loss in % | Viscosity* SK.F | Viscosity* SK.E + SK.F | Viscosity increase[3] in % |
|---|---|---|---|---|---|---|
| 10 | 328 | 8.4 | 97 | 12 | 166 | 1,876 |

| Example | Viscosity* SK.G without (a2.x) | Viscosity* SK.G | Viscosity loss in % | Viscosity* SK.H | Viscosity* SK.G + SK.H | Viscosity increase[4] in % |
|---|---|---|---|---|---|---|
| 11 | 768 | 120 | 84 | 11 | 763 | 536 |

| Example | Viscosity* SK.I without (a2.x) | Viscosity* SK.I | Viscosity loss in % | Viscosity* SK.J | Viscosity* SK.I + SK.J | Viscosity increase[5] in % |
|---|---|---|---|---|---|---|
| 12 | 80.6 | 46.3 | 43 | 4.3 | 247 | 433 |
| 13 | 80.6 | 62.9 | 22 | 4.3 | 305 | 385 |

*in Pascal seconds;
[1] compared to SK.A;
[2] compared to SK.C;
[3] compared to SK.E;
[4] compared to SK.G;
[5] compared to SK.I In Comparative Example V1, the base components SK.A and SK.B were manufactured without the compounds (a2) and (b1). It is clear that the viscosity of the thixotropic base component SK.A is very high and the viscosity falls dramatically when the hardener (base component SK.B) is added.

In Comparative Example V2, the base component SK.A was manufactured without the wetting and dispersing agent (a2) and base component SK.B was manufactured with 1.0 g of the polymer (b1) (in this instance: (b1.1)). It is clear that the viscosity of both the base component SK.A and the mixture of base components SK.A and SK.B is very high.

In Comparative Example V3, the base component SK.A was manufactured with the wetting and dispersing agent (a2) (in this instance: (a2.2)) and the base component SK.B was manufactured with 1.5 g of the polymer (b1) (in this instance: (b1.1)). It is clear that despite the addition of a compound (b1), structural development of the silicic acid no longer took place; i.e., the viscosity of the mixture of base components SK.A and SK.B remained low.

In Examples 1 through 13 according to the invention, various two-component systems were made from the components listed in Tables 2 through 6, in the respective amounts indicated in the tables.

The viscosity of the thixotropic base components SK.A, SK.C, SK.E, SK.G and SK.I is as a result of the use of the respective wetting and dispersing agents (a2.x) significantly lower than for the respective base component without the respective wetting and dispersing agent (a2.x). The addition of the wetting and dispersing agent to the base components SK.A, SK.C, SK.E, SK.G and SK.I leads to a reduction in viscosity (viscosity loss) from 22% (Example 13) up to 99% (Examples 2 and 3). The non-thixotropic, but the polymer (b1.x) containing base components (hardener components) SK.B, SK.D, SK.F, SK.H and SK.J exhibit low viscosities prior to being mixed with the respectively complementary base components SK.A, SK.C, SK.E, SK.G and SK.I. Due to the low starting viscosities of the base components supplemented with modules A or B, they can be easily processed and in particular mix easily and homogeneously. The viscosities of the two-component systems achieved two minutes after mixing of the base components pertinent to one another far exceed the viscosities of the base components SK.A, SK.C, SK.E, SK.G and SK.I supplemented with module A. The corresponding increase in viscosity of the base components SK.B, SK.D, SK.F, SK.H and SK.I supplemented with module B is from 68% (Example 9) to 7,400% (Example 3).

Aqueous Epoxy Resin/Amine Hardener Systems

The following describes the manufacture of aqueous two-component systems according to the invention that in each instance are obtained from two base components by mixing, as indicated below.

Manufacturing the Base Component SK.K

The individual components are added one after the other in the amounts indicated in Table 8 while stirring at room temperature (23° C.) with the dissolver Pendraulik TD 100 with a serrated disk at 2 m/s and then for homogenization stirred for an additional 1 minute at 5 m/s, 1 minute at 10 m/s, and 1 minute at 15 m/s.

Manufacturing the Base Component SK.L

The amine hardener (Epikure 8545-W-52) and the polymer (b1.2) are mixed with water while stirring at room temperature (23° C.) with the dissolver Pendraulik TD 100 with a serrated disk at 2 m/s and then for homogenization homogenized for 3 minutes at 5 m/s. (ok)

TABLE 8

(amounts indicated in g)

| Components | | Example 14 | | Example 15 | |
|---|---|---|---|---|---|
| | | SK.K | SK.L | SK.K | SK.L |
| Epikote 816 MV | | 91.5 | | 91.5 | |
| BYK-A 530 | | 0.5 | | 0.5 | |
| Module A | (a1.1) | 8.0 | | 8.0 | |
| | (a2.1) | 4.8 | | 4.8 | |
| Epikure 8545-W-52 | | | 14 | | 140 |
| Water | | | 60 | | 60 |
| Module B | (b1.2) | | 9.6 | | 16 |

Table 9 below shows the technical application data related to Examples 14 and 15 according to the invention:

TABLE 9

| Example | Viscosity* SK.E without (a2.1) | Viscosity* SK.K | Viscosity loss in % | Viscosity* SK.L | Viscosity* SK.K + SK.L | Viscosity increase[1] in % |
|---|---|---|---|---|---|---|
| 14 | 105 | 35.5 | 66 | 3.8 | 44.3 | 25 |
| 15 | 105 | 35.5 | 66 | 5.2 | 65.5 | 85 |

*in Pascal seconds;

[1]compared to SK.K

It is also clear in the aqueous systems of Examples 14 and 15 that component (b1.2) also results in a significantly lower rebound of the viscosity of the previously inhibited system.

Polyurethane-Forming Systems

The following describes the manufacture of polyurethane two-component systems according to the invention that in each instance are obtained from two base components by mixing, as indicated below.

Manufacturing Base Components SK.UA, SK.UC and SK.UE

The individual components of base components SK.UA, SK.UC and SK.UE are added one after the other in the amounts indicated in Tables 10 through 19 while stirring at room temperature (23° C.) with the dissolver Pendraulik TD 100 with a serrated disk at 2 m/s and then for homogenization stirred for an additional 1 minute at 5 m/s, 1 minute at 10 m/s, and 1 minute at 15 m/s. The viscosity of these systems is then measured at room temperature (23° C.).

Manufacturing Base Component SK.UG

Sedathane D1150, UOP-L Paste and BYK-088 are mixed in the amount indicated in Table 20 while stirring at room temperature (23° C.) with the dissolver Pendraulik TD 100 with a serrated disk at 5 m/s for one minute. EWO is then added and mixed for an additional 2 minutes at 5 m/s. Garamite 7305 is then added and stirred for 1 Minute at 5 m/s, 1 minute at 10 m/s, 1 minute at 15 m/s. The viscosity of these systems is then measured at room temperature (23° C.).

Description of the Unfinished Goods by Combining the Base Components SK.UA and SK.UB. SK.UC and SK.UD, SK.UE and SK.UF, as well as SK.UG and SK.UH The two base components SK.A and SK.B (or SK.0 and SK.D; SK.E and SK.F; or SK G and SK.H) are mixed together and homogenized with the dissolver Pendraulik TD 100 with a serrated disk at 5 m/s for 1 minute. The viscosity is measured after 2 minutes.

TABLE 10

(amounts indicated in g)

| | | Comparative example VU1 | | Comparative example VU2 | | Comparative example VU3 | |
|---|---|---|---|---|---|---|---|
| Components | | SK.UA | SK.UB | SK.UA | SK.UB | SK.UA | SK.UB |
| Setathane D 1150 | | 94.5 | | 94.5 | | 94.5 | |
| BYK-088 | | 0.5 | | 0.5 | | 0.5 | |
| Module A | (a1.1) | 6.0 | | 6.0 | | 6.0 | |
| | (a2.11) | 0.0 | | 0.0 | | 2.4 | |
| Desmodur VL | | | 37.0 | | 37.0 | | 37.0 |
| Module B | (b1.3) | | 0.0 | | 1.2 | | 1.2 |

TABLE 11

(amounts indicated in g)

| Components | | Example U1 SK.UA | Example U1 SK.UB | Example U2 SK.UA | Example U2 SK.UB | Example U3 SK.UA | Example U3 SK.UB | Example U4 SK.UA | Example U4 SK.UB | Example U5 SK.UA | Example U5 SK.UB | Example U6 SK.UA | Example U6 SK.UB |
|---|---|---|---|---|---|---|---|---|---|---|---|---|---|
| Setathane D 1150 | | 94.5 | | 94.5 | | 94.5 | | 94.5 | | 94.5 | | 94.5 | |
| BYK-088 | | 0.5 | | 0.5 | | 0.5 | | 0.5 | | 0.5 | | 0.5 | |
| Module A | a1.1 | 6.0 | | 6.0 | | 6.0 | | 6.0 | | 6.0 | | 6.0 | |
| | a2.x | 2.4[1] | | 2.4[1] | | 2.4[2] | | 2.4[2] | | 3.6[3] | | 3.6[3] | |
| Desmodur VL | | | 37.0 | | 37.0 | | 37.0 | | 37.0 | | 37.0 | | 37.0 |
| Module B | b1.x | | 1.2* | | 1.2** | | 1.2* | | 1.2** | | 1.2* | | 1.2** |

[1] = (a2.11);
[2] = (a2.1);
[3] = (a2.13);
* = (b1.1);
** = (b1.2)

TABLE 12

(amounts indicated in g)

| Components | | Example U7 SK.UA | Example U7 SK.UB | Example U8 SK.UA | Example U8 SK.UB | Example U9 SK.UA | Example U9 SK.UB | Example U10 SK.UA | Example U10 SK.UB |
|---|---|---|---|---|---|---|---|---|---|
| Setathane D 1150 | | 94.5 | | 94.5 | | 94.5 | | 94.5 | |
| BYK-088 | | 0.5 | | 0.5 | | 0.5 | | 0.5 | |
| Module A | (a1.1) | 6.0 | | 6.0 | | 6.0 | | 6.0 | |
| | (a2.11) | 2.4 | | 2.4 | | 2.4 | | 2.4 | |
| Desmodur VL | | | 37.0 | | 37.0 | | 37.0 | | 37.0 |
| Module B | (b1.x) | | 1.2* | | 1.2** | | 1.2*** | | 1.2**** |

* = (b1.11);
** = (b1.8);
*** = (b1.9);
**** = (b1.10)

TABLE 13

(amounts indicated in g)

| Components | | Example LH1 SK.UA | Example LH1 SK.UB | Example U12 SK.UA | Example U12 SK.UB | Example U13 SK.UA | Example U13 SK.UB |
|---|---|---|---|---|---|---|---|
| Setathane D 1150 | | 94.5 | | 94.5 | | 94.5 | |
| BYK-088 | | 0.5 | | 0.5 | | 0.5 | |
| Module A | (a1.1) | 6.0 | | 6.0 | | 6.0 | |
| | (a2.1) | 2.4 | | 2.4 | | 2.4 | |
| Desmodur VL | | | 37.0 | | 37.0 | | 37.0 |
| Module B | (b1.x) | | 1.2* | | 1.2** | | 1.2*** |

* = (b1.11);
** = (b1.8);
*** = (b1.9)

TABLE 14

(amounts indicated in g)

| Components | | Example U14 SK.UA | Example U14 SK.UB | Example U15 SK.UA | Example U15 SK.UB | Example U16 SK.UA | Example U16 SK.UB | Example U17 SK.UA | Example U17 SK.UB |
|---|---|---|---|---|---|---|---|---|---|
| Setathane D 1150 | | 94.5 | | 94.5 | | 94.5 | | 94.5 | |
| BYK-088 | | 0.5 | | 0.5 | | 0.5 | | 0.5 | |
| Module A1 | (a1.1) | 6.0 | | 6.0 | | 6.0 | | 6.0 | |
| | (a2.13) | 3.6 | | 3.6 | | 3.6 | | 3.6 | |

TABLE 14-continued (amounts indicated in g)

|  | Example U14 | | Example U15 | | Example U16 | | Example U17 | |
|---|---|---|---|---|---|---|---|---|
| Components | SK.UA | SK.UB | SK.UA | SK.UB | SK.UA | SK.UB | SK.UA | SK.UB |
| Desmodur VL |  | 37.0 |  | 37.0 |  | 37.0 |  | 37.0 |
| Module B (b1.x) |  | 1.2* |  | 1.2** |  | 1.2*** |  | 1.2**** |

\* = (b1.11);
\*\* = (b1.8);
\*\*\* = (b1.9);
\*\*\*\* = (b1.10)

TABLE 15

(amounts indicated in g)

|  | Example U18 | | Example U19 | | Example U20 | | Example U21 | | Example U22 | | Example U23 | |
|---|---|---|---|---|---|---|---|---|---|---|---|---|
| Components | SK.UC | SK.UD | SK.UC | SK.UD | SK.UC | SK.UC | SK.UC | SK.UC | SK.UC | SK.UD | SK.UC | SK.UD |
| Setathane D 1150 | 94.5 |  | 94.5 |  | 94.5 |  | 94.5 |  | 94.5 |  | 94.5 |  |
| BYK-088 | 0.5 | 0.5 | 0.5 | 0.5 | 0.5 | 0.5 |  |  |  |  |  |  |
| Module A (a1.2) | 5.0 |  | 5.0 |  | 5.0 |  | 5.0 |  | 5.0 |  | 5.0 |  |
| (a2.x) | 3.01 |  | 3.01 |  | 3.02 |  | 3.02 |  | 5.03 |  | 5.03 |  |
| Desmodur VL |  | 37.0 |  | 37.0 |  | 37.0 |  | 37.0 |  | 37.0 |  | 37.0 |
| Module B (b1.x) |  | 1.0* |  | 1.0** |  | 1.0* |  | 1.0** |  | 1.0* |  | 1.0** |

1 = (a2.11);
2 = (a2.1);
3 = (a2.13);
\* = (b1.1);
\*\* = (b1.2)

TABLE 16

(amounts indicated in g)

|  | Example U24 | | Example U25 | | Example U26 | | Example U27 | | Example U28 | |
|---|---|---|---|---|---|---|---|---|---|---|
| Components | SK.UC | SK.UD | SK.UC | SK.UD | SK.UC | SK.UC | SK.UC | SK.UC | SK.UC | SK.UD |
| Setathane D 1150 | 94.5 |  | 94.5 |  | 94.5 |  | 94.5 |  | 94.5 |  |
| BYK-088 | 0.5 |  | 0.5 |  | 0.5 |  | 0.5 |  | 0.5 |  |
| Module A (a1.2) | 5.0 |  | 5.0 |  | 5.0 |  | 5.0 |  | 5.0 |  |
| (a2.11) | 3.0 |  | 3.0 |  | 3.0 |  | 3.0 |  | 3.0 |  |
| Desmodur VL |  | 37.0 |  | 37.0 |  | 37.0 |  | 37.0 |  | 37.0 |
| Module B (b1.x) |  | 1.0* |  | 0.5** |  | 1.0** |  | 1.0*** |  | 1**** |

\* = (b1.11);
\*\* = (b1.8);
\*\*\* = (b1.9);
\*\*\*\* = (b1.10)

TABLE 17

(amounts indicated in g)

|  | Example U29 | | Example U30 | | Example U31 | | Example U32 | |
|---|---|---|---|---|---|---|---|---|
| Components | SK.UC | SK.UD | SK.UC | SK.UD | SK.UC | SK.UC | SK.UC | SK.UD |
| Setathane D 1150 | 94.5 |  | 94.5 |  | 94.5 |  | 94.5 |  |
| BYK-088 | 0.5 |  | 0.5 |  | 0.5 |  | 0.5 |  |
| Module (a1.2) | 5.0 |  | 5.0 |  | 5.0 |  | 5.0 |  |

TABLE 17-continued (amounts indicated in g)

| Components | | Example U29 | | Example U30 | | Example U31 | | Example U32 | |
|---|---|---|---|---|---|---|---|---|---|
| | | SK.UC | SK.UD | SK.UC | SK.UD | SK.UC | SK.UC | SK.UC | SK.UD |
| A | (a2.1) | 2.0 | | 2.0 | | 2.0 | | 2.0 | |
| Desmodur VL | | | 37.0 | | 37.0 | | 37.0 | | 37.0 |
| Module B | (b1.x) | | 0.5* | | 1.0* | | 1.0** | | 1.0*** |

\* = (b1.8);
\*\* = (b1.9);
\*\*\* = (b1.10)

TABLE 18

(amounts indicated in g)

| Components | | Example U33 | | Example U34 | | Example U35 | |
|---|---|---|---|---|---|---|---|
| | | SK.UC | SK.UD | SK.UC | SK.UC | SK.UC | SK.UD |
| Setathane D 1150 | | 94.5 | | 94.5 | | 94.5 | |
| BYK-088 | | 0.5 | | 0.5 | | 0.5 | |
| Module | (a1.2) | 5.0 | | 5.0 | | 5.0 | |
| A | a2.13) | 5.0 | | 5.0 | | 5.0 | |
| Desmodur VL | | | 37.0 | | 37.0 | | 37.0 |
| Module B | (b1.x) | | 1.0* | | 0.5** | | 1.0*** |

\* = (b1.11);
\*\* = (b1.8);
\*\*\* = (b1.9)

TABLE 19

(amounts indicated in g)

| Components | | Example U36 | | Example U37 | | Example U38 | | Example U39 | | Example U40 | | Example U41 | |
|---|---|---|---|---|---|---|---|---|---|---|---|---|---|
| | | SK.UE | SK.UF | SK.UE | SK.UF | SK.UE | SK.UF | SK.UE | SK.UF | SK.UE | SK.UF | SK.UE | SK.UF |
| Setathane D 1150 | | 13.5 | | 13.5 | | 13.5 | | 13.5 | | 13.5 | | 13.5 | |
| Setathane D 1145 | | 16.0 | | 16.0 | | 16.0 | | 16.0 | | 16.0 | | 16.0 | |
| BYK-088 | | 0.5 | | 0.5 | | 0.5 | | 0.5 | | 0.5 | | 0.5 | |
| EWO | | 38.5 | | 38.5 | | 38.5 | | 38.5 | | 38.5 | | 38.5 | |
| MOLSIV | | 7.4 | | 7.4 | | 7.4 | | 7.4 | | 7.4 | | 7.4 | |
| Bayferrox 318M Paste (50%) in Setathane D1150 | | 5.0 | | 5.0 | | 5.0 | | 5.0 | | 5.0 | | 5.0 | |
| Module A | (a1.1) | 2.0 | | 2.0 | | 2.0 | | 2.0 | | 2.0 | | 2.0 | |
| | (a2.x) | 0.8[1] | | 0.8[1] | | 0.4[2] | | 0.4[2] | | 0.4[2] | | 0.4[2] | |
| Desmodur VL | | | 17.1 | | 17.1 | | 17.1 | | 17.1 | | 17.1 | | 17.1 |
| Module B | (b1.x) | | 0.4* | | 0.8* | | 0.4* | | 0.8* | | 0.2** | | 0.4** |

[1] = (a2.11);
[2] = (a2.1);
\* = (b1.1);
\*\* = (b1.2)

TABLE 20

(amounts indicated in g)

| Components | Example U42 SK.UG | Example U42 SK.UH | Example U43 SK.UG | Example U43 SK.UH | Example U44 SK.UG | Example U44 SK.UH |
|---|---|---|---|---|---|---|
| Setathane D 1150 | 54.0 | | 54.0 | | 54.0 | |
| UOP-L Paste | 6.0 | | 6.0 | | 6.0 | |
| BYK-088 | 1.0 | | 1.0 | | 1.0 | |
| EWO | 37.5 | | 37.5 | | 37.5 | |
| Module A (a1.3) | 1.5 | | 1.5 | | 1.5 | |
| (a2.x) | 0.9[1] | | 0.9[2] | | 0.9[3] | |
| Desmodur VL | | 37.0 | | 37.0 | | 37.0 |
| Module B (b1.x) | | 0.3* | | 0.3* | | 0.3* |

[1] = (a2.11);
[2] = (a2.9);
[3] = (a2.13);
* = (b1.1)

TABLE 21

| Comparative example | Viscosity* SK.A without (a2.x) | Viscosity* SK.UA | Viscosity loss in % | Viscosity* SK.UB | Viscosity* SK.UA + SK.UB | Viscosity increase[1] in % |
|---|---|---|---|---|---|---|
| VU1 | 56.8 | ./. | ./. | 0.09 | 12.5 | ./. |
| VU2 | 56.8 | ./. | ./. | 0.09 | 292.8 | ./. |
| VU3 | 56.8 | 18.3 | 68 | 0.09 | 7.9 | — |

| Example | Viscosity* SK.A without (a2.x) | Viscosity* SK.UA | Viscosity loss in % | Viscosity* SK.UB | Viscosity* SK.UA + SK.UB | Viscosity increase[1] in % |
|---|---|---|---|---|---|---|
| U1 | 56.8 | 18.3 | 68 | 0.09 | 493.1 | 2,595 |
| U2 | 56.8 | 18.3 | 68 | 0.09 | 285.6 | 1,461 |
| U3 | 56.8 | 6.2 | 89 | 0.09 | 302.9 | 4785 |
| U4 | 56.8 | 6.2 | 89 | 0.09 | 188.4 | 2,939 |
| U5 | 56.8 | 19.0 | 67 | 0.09 | 90.8 | 378 |
| U6 | 56.8 | 19.0 | 67 | 0.09 | 241.2 | 1,169 |
| U7 | 56.8 | 18.3 | 68 | 0.09 | 113.9 | 522 |
| U8 | 56.8 | 18.3 | 68 | 0.09 | 650.2 | 3,453 |
| U9 | 56.8 | 18.3 | 68 | 0.09 | 130.7 | 614 |
| U10 | 56.8 | 18.3 | 68 | 0.09 | 205.1 | 1,021 |
| U11 | 56.8 | 6.2 | 89 | 0.09 | 43.9 | 608 |
| U12 | 56.8 | 6.2 | 89 | 0.09 | 716.1 | 11,450 |
| U13 | 56.8 | 6.2 | 89 | 0.09 | 71.4 | 1,051 |
| U14 | 56.8 | 19.0 | 67 | 0.09 | 31.0 | 63 |
| U15 | 56.8 | 19.0 | 67 | 0.09 | 777.0 | 3,989 |
| U16 | 56.8 | 19.0 | 67 | 0.09 | 53.8 | 183 |
| U17 | 56.8 | 19.0 | 67 | 0.09 | 143.6 | 656 |

| Example | Viscosity* SK.UC without (a2.x) | Viscosity* SK.UC | Viscosity loss in % | Viscosity* SK.UD | Viscosity* SK.UC + SK.UD | Viscosity increase[2] in % |
|---|---|---|---|---|---|---|
| U18 | 65.8 | 11.8 | 82 | 0.09 | 238.7 | 1,923 |
| U19 | 65.8 | 11.8 | 82 | 0.09 | 338.4 | 2,768 |
| U20 | 65.8 | 11.4 | 83 | 0.09 | 60.1 | 427 |
| U21 | 65.8 | 11.4 | 83 | 0.09 | 14.9 | 31 |
| U22 | 65.8 | 6.1 | 91 | 0.09 | 70.7 | 1,059 |
| U23 | 65.8 | 6.1 | 91 | 0.09 | 13.4 | 120 |
| U24 | 65.8 | 11.8 | 82 | 0.09 | 98.3 | 733 |
| U25 | 65.8 | 11.8 | 82 | 0.09 | 168.1 | 1,325 |
| U26 | 65.8 | 11.8 | 82 | 0.09 | 427.5 | 3,523 |
| U27 | 65.8 | 11.8 | 82 | 0.09 | 646.8 | 5,381 |
| U28 | 65.8 | 11.8 | 82 | 0.09 | 716.3 | 5,970 |
| U29 | 65.8 | 11.4 | 83 | 0.09 | 19.0 | 67 |
| U30 | 65.8 | 11.4 | 83 | 0.09 | 243.7 | 2,038 |
| U31 | 65.8 | 11.4 | 83 | 0.09 | 65.7 | 476 |
| U32 | 65.8 | 11.4 | 83 | 0.09 | 37.3 | 227 |
| U33 | 65.8 | 6.1 | 91 | 0.09 | 17.1 | 180 |
| U34 | 65.8 | 6.1 | 91 | 0.09 | 25.7 | 321 |
| U35 | 65.8 | 6.1 | 91 | 0.09 | 28.1 | 361 |

TABLE 21-continued

| Example | Viscosity* SK.UE without (a2.x) | Viscosity* SK.UE | Viscosity loss in % | Viscosity* SK.UF | Viscosity* SK.UE + SK.UF | Viscosity increase[3] in % |
|---|---|---|---|---|---|---|
| U36 | 227 | 135.9 | 40 | 0.09 | 583.0 | 329 |
| U37 | 227 | 135.9 | 40 | 0.09 | 869.0 | 539 |
| U38 | 227 | 45.1 | 80 | 0.09 | 850.1 | 1,785 |
| U39 | 227 | 45.1 | 80 | 0.09 | 7,215.0 | 15,898 |
| U40 | 227 | 45.1 | 80 | 0.09 | 246.0 | 445 |
| U41 | 227 | 45.1 | 80 | 0.09 | 768.2 | 1,603 |

| Example | Viscosity* SK.UG without (a2.x) | Viscosity* SK.UG | Viscosity loss in % | Viscosity* SK.UH | Viscosity* SK.UG + SK.UH | Viscosity increase[4] in % |
|---|---|---|---|---|---|---|
| U42** | 9.7 | 9.0 | 7 | 0.09 | 11.9 | 32 |
| U43** | 9.7 | 9.3 | 4 | 0.09 | 12.2 | 131 |
| U44** | 9.7 | 8.4 | 13.4 | 0.09 | 12.5 | 49 |

* in Pascal seconds;
** different: viscosity determined with a Brookfield viscometer at 23° C. with spindle 3 at shear rate of 5 rpm;
[1] compared to SK.UA;
[2] compared to SK.UC;
[3] compared to SK.UE;
[4] compared to SK.UG Systems with Unsaturated polyesters
Manufacturing base components SK.PA, SK.PC, SK.PE, SK.PG, SK.PI and SK.PK The individual components of base components SK.PA, SK.PC, SK.PE, SK.PG, SK.PI and SK.PK are added one after the other in the amounts indicated in Tables 22 through 36 while stirring at room temperature (23° C.) with the dissolver Pendraulik TD 100 with a serrated disk at 2 to 5 m/s and then for homogenization stirred for an additional 1 minute at 5 m/s, 1 minute at 10 m/s, and 1 minute at 15 m/s. The viscosity of these systems is then measured at room temperature (23° C.).

Description of the Unfinished Goods by Combining Base Components SK.PA and SK.PB, SK.PC and SK.PD, SK.PE and SK.PF, SK.PG and SK.PH, SK.PI and SK.PJ, as Well as SK.PK and SK.PL.

The base components SK.PB, SK.PD, SK.PF, SK.PH, SK.PJ and SK.PL are added to the other base components SK.PA, SK.PC, SK.PE, SK.PG, SK.PI and SK.PK and homogenized with the dissolver Pendraulik TD 100 with a serrated disk at 5 m/s for 1 minute. The viscosity is measured after 2 minutes.

TABLE 22

(amounts indicated in g)

| Components | | Comparative example VP1 | | Comparative example VP2 | |
|---|---|---|---|---|---|
| | | SK.PA | SK.PB | SK.PA | SK.PB |
| Palatal A400 | | 93.56 | | 93.56 | |
| BYK-A 555 | | 0.50 | | 0.50 | |
| NL 51 P | | 0.99 | | 0.99 | |
| Module A | (a1.1) | 4.95 | | 4.95 | |
| | (a2.x) | 0.0 | | 0.0 | |
| MEKP Butanox M50 | | | 1.0 | | 1.0 |
| Module B | (b1.7) | | 0.0 | | 1.0 |

TABLE 23

(amounts indicated in g)

| Components | | Example P1 | | Example P2 | | Example P3 | | Example P4 | | Example P5 | |
|---|---|---|---|---|---|---|---|---|---|---|---|
| | | SK.PA | SK.PB | SK.PA | SK.PB | SK.PA | SK.PB | SK.PA | SK.PB | SK.PA | SK.PB |
| Palatal A 400 | | 93.56 | | 93.56 | | 93.56 | | 93.56 | | 93.56 | |
| BYK-A 555 | | 0.50 | | 0.50 | | 0.50 | | 0.50 | | 0.50 | |
| NL 51 P | | 0.99 | | 0.99 | | 0.99 | | 0.99 | | 0.99 | |
| Module A | (a1.1) | 4.95 | | 4.95 | | 4.95 | | 4.95 | | 4.95 | |
| | (a2.x) | 3.5[*1] | | 3.5[1] | | 3.5[1] | | 3.5[2] | | 3.5[2] | |
| MEKP Butanox M50 | | | 1.0 | | 1.0 | | 1.0 | | 1.0 | | 1.0 |
| Module B | (b1.x) | | 0.99* | | 2.97** | | 0.99*** | | 0.99** | | 0.99**** |

[1] = (a2.1);
[2] = (a2.7);
* = (b1.7);
** = (b1.3);
*** = (b1.1);
**** = (b1.2)

TABLE 24

(amounts indicated in g)

| Components | Example P6 SK.PA | Example P6 SK.PB | Example P7 SK.PA | Example P7 SK.PB | Example P8 SK.PA | Example P8 SK.PB | Example P9 SK.PA | Example P9 SK.PB | Example P10 SK.PA | Example P10 SK.PB |
|---|---|---|---|---|---|---|---|---|---|---|
| Palatal A 400 | 93.56 | | 93.56 | | 93.56 | | 93.56 | | 93.56 | |
| BYK-A 555 | 0.50 | | 0.50 | | 0.50 | | 0.50 | | 0.50 | |
| NL 51 P | 0.99 | | 0.99 | | 0.99 | | 0.99 | | 0.99 | |
| Module A (a1.1) | 4.95 | | 4.95 | | 4.95 | | 4.95 | | 4.95 | |
| (a2.9) | 3.5 | | 3.5 | | 3.5 | | 2.0 | | 2.0 | |
| MEKP Butanox M50 | | 1.0 | | 1.0 | | 1.0 | | 1.0 | | 1.0 |
| Module B (b1.x) | | 0.99* | | 0.99** | | 0.99*** | | 1.98*** | | 2.97*** |

*= (b1.1);
**= (b1.7);
***= (b1.3);

TABLE 25

(amounts indicated in g)

| Components | Example P11 SK.PC | Example P11 SK.PD | Example P12 SK.PC | Example P12 SK.PD | Example P13 SK.PC | Example P13 SK.PD | Example P14 SK.PC | Example P14 SK.PD | Example P15 SK.PC | Example P15 SK.PD |
|---|---|---|---|---|---|---|---|---|---|---|
| Palatal P4 | 92.65 | | 92.65 | | 92.65 | | 92.65 | | 92.65 | |
| BYK-A 555 | 0.49 | | 0.49 | | 0.49 | | 0.49 | | 0.49 | |
| NL 49 P | 1.96 | | 1.96 | | 1.96 | | 1.96 | | 1.96 | |
| Module A (a1.1) | 4.90 | | 4.90 | | 4.90 | | 4.90 | | 4.90 | |
| (a2.7) | 3.5 | | 3.5 | | 3.5 | | 3.5 | | 3.5 | |
| MEKP Butanox M50 | | 1.5 | | 1.5 | | 1.5 | | 1.5 | | 1.5 |
| Module B (b1.x) | | 0.98* | | 0.98** | | 0.98*** | | 0.98**** | | 0.98***** |

*= (b1.3);
**= (b1.1);
***= (b1.2);
****= (b1.7);
*****= (b1.10)

TABLE 26

(amounts indicated in g)

| Components | Example P16 SK.PC | Example P16 SK.PD | Example P17 SK.PC | Example P17 SK.PD | Example P18 SK.PC | Example P18 SK.PD | Example P19 SK.PC | Example P19 SK.PD | Example P20 SK.PC | Example P20 SK.PD |
|---|---|---|---|---|---|---|---|---|---|---|
| Palatal P4 | 92.65 | | 92.65 | | 92.65 | | 92.65 | | 92.65 | |
| BYK-A 555 | 0.49 | | 0.49 | | 0.49 | | 0.49 | | 0.49 | |
| NL 49 P | 1.96 | | 1.96 | | 1.96 | | 1.96 | | 1.96 | |
| Module A (a1.1) | 4.90 | | 4.90 | | 4.90 | | 4.90 | | 4.90 | |
| (a2.1) | 3.5 | | 3.5 | | 3.5 | | 3.5 | | 3.5 | |
| MEKP Butanox M50 | | 1.5 | | 1.5 | | 1.5 | | 1.5 | | 1.5 |
| Module B (b1.x) | | 1.0* | | 1.0** | | 1.0*** | | 1.0**** | | 1.0***** |

*= (b1.3);
**= (b1.1);
***= (b1.2);
****= (b1.7);
*****= (b1.10)

TABLE 27

(amounts indicated in g)

| Components | | Example P21 SK.PC | Example P21 SK.PD | Example P22 SK.PC | Example P22 SK.PD | Example P23 SK.PC | Example P23 SK.PD | Example P24 SK.PC | Example P24 SK.PD | Example P25 SK.PC | Example P25 SK.PD |
|---|---|---|---|---|---|---|---|---|---|---|---|
| Palatal P4 | | 92.65 | | 92.65 | | 92.65 | | 92.65 | | 92.65 | |
| BYK-A 555 | | 0.49 | | 0.49 | | 0.49 | | 0.49 | | 0.49 | |
| NL 49 P | | 1.96 | | 1.96 | | 1.96 | | 1.96 | | 1.96 | |
| Module A | (a1.1) | 4.90 | | 4.90 | | 4.90 | | 4.90 | | 4.90 | |
| | (a2.9) | 3.5 | | 3.5 | | 3.5 | | 3.5 | | 3.5 | |
| MEKP Butanox M50 | | | 1.5 | | 1.5 | | 1.5 | | 1.5 | | 1.5 |
| Module B | (b1.x) | | 1.0* | | 1.0** | | 1.0*** | | 1.0**** | | 1.0***** |

*= (b1.3);
**= (b1.1);
***= (b1.2);
****= (b1.7);
*****= (b1.10)

TABLE 28

(amounts indicated in g)

| Components | | Example P26 SK.PC | Example P26 SK.PD | Example P27 SK.PC | Example P27 SK.PD |
|---|---|---|---|---|---|
| Palatal P4 | | 92.65 | | 92.65 | |
| BYK-A 555 | | 0.49 | | 0.49 | |
| NL 49 P | | 1.96 | | 1.96 | |
| Module A | (a1.1) | 4.90 | | 4.90 | |
| | (a2.9) | 3.5 | | 3.5 | |
| MEKP Butanox M50 | | | 1.5 | | 1.5 |
| Module B | (b1.3) | | 1.96 | | 2.94 |

TABLE 29

(amounts indicated in g)

| Components | | Example P28 SK.PE | Example P28 SK.PF | Example P29 SK.PE | Example P29 SK.PF | Example P30 SK.PE | Example P30 SK.PF |
|---|---|---|---|---|---|---|---|
| Palatal A410 | | 95.45 | | 95.45 | | 95.45 | |
| BYK-A 555 | | 0.50 | | 0.50 | | 0.50 | |
| NL 51 P | | 0.99 | | 0.99 | | 0.99 | |
| Module A | (a1.2) | 2.97 | | 2.97 | | 2.97 | |
| | (a2.1) | 2.97 | | 0.59 | | 0.59 | |
| MEKP Butanox M50 | | | 1.0 | | 1.0 | | 1.0 |
| Module B | (b1.3) | | 0.59 | | 1.19 | | 1.78 |

TABLE 30

(amounts indicated in g)

| Components | | Example P31 SK.PE | Example P31 SK.PF | Example P32 SK.PE | Example P32 SK.PF | Example P33 SK.PE | Example P33 SK.PF |
|---|---|---|---|---|---|---|---|
| Palatal A410 | | 95.45 | | 95.45 | | 95.45 | |
| BYK-A 555 | | 0.50 | | 0.50 | | 0.50 | |
| NL 51 P | | 0.99 | | 0.99 | | 0.99 | |
| Module A | (a1.2) | 2.97 | | 2.97 | | 2.97 | |
| | (a2.x) | 2.97$^1$ | | 2.97$^2$ | | 2.97$^3$ | |
| MEKP Butanox M50 | | | 1.0 | | 1.0 | | 1.0 |
| Module B | (b1.1) | | 0.59 | | 0.59 | | 0.59 |

$^1$= (a2.7);
$^2$= (a2.1);
$^3$= (a2.9);

TABLE 31

(amounts indicated in g)

| Components | | Example P34 SK.PE | Example P34 SK.PF | Example P35 SK.PE | Example P35 SK.PF | Example P36 SK.PE | Example P36 SK.PF | Example P37 SK.PE | Example P37 SK.PF | Example P38 SK.PE | Example P38 SK.PF |
|---|---|---|---|---|---|---|---|---|---|---|---|
| Palatal A410 | | 95.45 | | 95.45 | | 95.45 | | 95.45 | | 95.45 | |
| BYK-A 555 | | 0.50 | | 0.50 | | 0.50 | | 0.50 | | 0.50 | |
| NL 51 P | | 0.99 | | 0.99 | | 0.99 | | 0.99 | | 0.99 | |
| Module A | (a1.1) | 2.97 | | 2.97 | | 2.97 | | 2.97 | | 2.97 | |
| | (a2.x) | 2.97$^1$ | | 2.97$^2$ | | 2.97$^3$ | | 0.59$^3$ | | 0.59$^3$ | |

TABLE 31-continued (amounts indicated in g)

| Components | Example P34 | | Example P35 | | Example P36 | | Example P37 | | Example P38 | |
|---|---|---|---|---|---|---|---|---|---|---|
| | SK.PE | SK.PF | SK.PE | SK.PF | SK.PE | SK.PF | SK.PE | SK.PF | SK.PE | SK.PF |
| MEKP Butanox M50 | | 1.0 | | 1.0 | | 1.0 | | 1.0 | | 1.0 |
| Module B (b1.x) | | 0.59* | | 0.59* | | 0.59** | | 1.19*** | | 2.38*** |

[1] = (a2.7);
[2] = (a2.9);
[3] = (a2.1);
* = (b1.10);
** = (b1.2);
*** = (b1.4)

TABLE 32

(amounts indicated in g)

| Components | Example P39 | | Example P40 | |
|---|---|---|---|---|
| | SK.PG | SK.PH | SK.PG | SK.PH |
| Palatal A400 | 79.75 | | 79.75 | |
| TiO$_2$ paste (50% by weight TiO$_2$ in Palatal A400) | 10.00 | | 10.00 | |
| NL 49 P | 1.00 | | 1.00 | |
| Styrene | 8.00 | | 8.00 | |
| Module A (a1.1) | 1.25 | | 1.25 | |
| (a2.7) | 0.88 | | 0.88 | |
| MEKP Butanox M50 | | 1.0 | | 1.0 |
| Module B (b1.x) | | 0.5* | | 0.5** |

* = (b1.1);
** = (b1.2)

TABLE 33

(amounts indicated in g)

| Components | Example P41 | | Example P42 | | Example P43 | |
|---|---|---|---|---|---|---|
| | SK.PG | SK.PH | SK.PG | SK.PH | SK.PG | SK.PH |
| Palatal A400 | 79.75 | | 79.75 | | 79.75 | |
| TiO$_2$ paste (50% by weight TiO$_2$ in Palatal A400) | 10.00 | | 10.00 | | 10.00 | |
| NL 49 P | 1.00 | | 1.00 | | 1.00 | |
| Styrene | 8.00 | | 8.00 | | 8.00 | |
| Module A (a1.1) | 1.25 | | 1.25 | | 1.25 | |
| (a2.1) | 0.88 | | 0.88 | | 0.88 | |
| MEKP Butanox M50 | | 1.0 | | 1.0 | | 1.0 |
| Module B (b1.x) | | 0.25* | | 0.25** | | 0.25*** |

* = (b1.3);
** = (b1.1);
*** = (b1.2)

TABLE 34

(amounts indicated in g)

| Components | Example P44 | | Example P45 | | Example P46 | |
|---|---|---|---|---|---|---|
| | SK.PG | SK.PH | SK.PG | SK.PH | SK.PG | SK.PH |
| Palatal A400 | 79.75 | | 79.75 | | 79.75 | |
| TiO$_2$ paste (50% by weight TiO$_2$ in Palatal A400) | 10.00 | | 10.00 | | 10.00 | |
| NL 49 P | 1.00 | | 1.00 | | 1.00 | |
| Styrene | 8.00 | | 8.00 | | 8.00 | |
| Module A (a1.1) | 1.25 | | 1.25 | | 1.25 | |
| (a2.9) | 0.50 | | 0.50 | | 0.50 | |
| MEKP Butanox M50 | | 1.0 | | 1.0 | | 1.0 |
| Module B (b1.3) | | 0.25 | | 0.50 | | 0.75 |

TABLE 35

(amounts indicated in g)

| Components | | Example P47 | | Example P48 | |
|---|---|---|---|---|---|
| | | SK.PI | SK.PJ | SK.PI | SK.PJ |
| COR 61-219-655 | | 93.56 | | 93.56 | |
| Byk-A 555 | | 0.50 | | 0.50 | |
| NL 51 P | | 0.99 | | 0.99 | |
| Module A | (a1.1) | 4.95 | | 4.95 | |
| | (a2.8) | 2.48 | | 2.48 | |
| MEKP Butanox M50 | | | 1.0 | | 1.0 |
| Module B | (b1.3) | | 0.99 | | 1.98 |

TABLE 36

(amounts indicated in g)

| Components | | Example P49 | | Example P50 | |
|---|---|---|---|---|---|
| | | SK.PK | SK.PL | SK.PK | SK.PL |
| Palatal P4 | | 59.31 | | 59.31 | |
| Byk-A 555 | | 0.50 | | 0.50 | |
| NL 51 P | | 0.99 | | 0.99 | |
| Apyral 1E | | 29.70 | | 29.70 | |
| Styrene | | 8.14 | | 8.14 | |
| Module A | (a1.5) | 1.36 | | 1.36 | |
| | (a2.6) | 0.95 | | 0.95 | |
| MEKP Butanox M50 | | | 1.0 | | 1.0 |
| Module B | (b1.3) | | 0.82 | | 0.27 |

TABLE 37

| Comparative example | Viscosity* SK.PA without (a2.x) | Viscosity* SK.PA | Viscosity loss in % | Viscosity* SK.PB | Viscosity* SK.PA + SK.PB | Viscosity increase[1] in % |
|---|---|---|---|---|---|---|
| VP1 | 67.3 | ./. | ./. | ./. | 67.3 | ./. |
| VP2 | 67.3 | ./. | ./. | ./. | 170.2 | ./. |

| Example | Viscosity* SK.PA without (a2.x) | Viscosity* SK.PA | Viscosity loss in % | Viscosity* SK.PB | Viscosity* SK.PA + SK.PB | Viscosity increase[1] in % |
|---|---|---|---|---|---|---|
| P1 | 67.3 | 27.8 | 59 | 1.2 | 46.1 | 69 |
| P2 | 67.3 | 27.8 | 59 | 1.2 | 63.0 | 127 |
| P3 | 67.3 | 27.8 | 59 | 1.2 | 65.4 | 135 |
| P4 | 67.3 | 15.4 | 77 | 1.2 | 15.8 | 3 |
| P5 | 67.3 | 15.4 | 77 | 1.2 | 18.5 | 20 |
| P6 | 67.3 | 4.0 | 94 | 1.2 | 7.6 | 90 |
| P7 | 67.3 | 4.0 | 94 | 1.2 | 7.1 | 78 |
| P8 | 67.3 | 4.0 | 94 | 1.2 | 29.8 | 645 |
| P9 | 67.3 | 28.2 | 58 | 1.2 | 61.5 | 118 |
| P10 | 67.3 | 28.2 | 58 | 1.2 | 116.3 | 312 |

| Example | Viscosity* SK.PC without (a2.x) | Viscosity* SK.PC | Viscosity loss in % | Viscosity* SK.PD | Viscosity* SK.PC + SK.PD | Viscosity increase[2] in % |
|---|---|---|---|---|---|---|
| P11 | 54.9 | 5.1 | 91 | 1.2 | 34.0 | 567 |
| P12 | 54.9 | 5.1 | 91 | 1.2 | 9.0 | 76 |
| P13 | 54.9 | 5.1 | 91 | 1.2 | 6.3 | 24 |
| P14 | 54.9 | 5.1 | 91 | 1.2 | 6.0 | 18 |
| P15 | 54.9 | 5.1 | 91 | 1.2 | 9.5 | 86 |
| P16 | 54.9 | 3.3 | 94 | 1.2 | 29.7 | 800 |
| P17 | 54.9 | 3.3 | 94 | 1.2 | 52.3 | 1,485 |
| P18 | 54.9 | 3.3 | 94 | 1.2 | 3.9 | 18 |
| P19 | 54.9 | 3.3 | 94 | 1.2 | 3.6 | 9 |
| P20 | 54.9 | 3.3 | 94 | 1.2 | 5.4 | 64 |
| P21 | 54.9 | 7.8 | 86 | 1.2 | 36.0 | 362 |
| P22 | 54.9 | 7.8 | 86 | 1.2 | 75.4 | 867 |
| P23 | 54.9 | 7.8 | 86 | 1.2 | 105.0 | 1,246 |
| P24 | 54.9 | 7.8 | 86 | 1.2 | 29.7 | 281 |
| P25 | 54.9 | 7.8 | 86 | 1.2 | 71.1 | 812 |
| P26 | 54.9 | 7.8 | 86 | 1.2 | 66.6 | 754 |
| P27 | 54.9 | 7.8 | 86 | 1.2 | 95.4 | 1,123 |

| Example | Viscosity* SK.PE without (a2.x) | Viscosity* SK.PE | Viscosity loss in % | Viscosity* SK.PF | Viscosity* SK.PE + SK.PF | Viscosity increase[3] in % |
|---|---|---|---|---|---|---|
| P28 | 31.7 | 5.7 | 82 | 1.2 | 10.2 | 79 |
| P29 | 31.7 | 4.4 | 86 | 1.2 | 25.8 | 486 |
| P30 | 31.7 | 4.4 | 86 | 1.2 | 48.0 | 991 |
| P31 | 31.7 | 22.5 | 29 | 1.2 | 25.9 | 15 |
| P32 | 31.7 | 5.7 | 82 | 1.2 | 6.9 | 21 |
| P33 | 31.7 | 4.4 | 86 | 1.2 | 7.5 | 70 |
| P34 | 31.7 | 22.5 | 29 | 1.2 | 23.9 | 6 |

TABLE 37-continued

| | | | | | | |
|---|---|---|---|---|---|---|
| P35 | 31.7 | 4.4 | 86 | 1.2 | 6.6 | 50 |
| P36 | 31.7 | 4.4 | 86 | 1.2 | 4.6 | 5 |
| P37 | 31.7 | 4.4 | 86 | 1.2 | 17.3 | 293 |
| P38 | 31.7 | 4.4 | 86 | 1.2 | 224.0 | 4991 |

| Example | Viscosity* SK.PG without (a2.x) | Viscosity* SK.PG | Viscosity loss in % | Viscosity* SK.PH | Viscosity* SK.PG + SK.PH | Viscosity increase[4] in % |
|---|---|---|---|---|---|---|
| P39 | 3.1 | 1.2 | 61 | 1.2 | 2.9 | 142 |
| P40 | 3.1 | 1.2 | 61 | 1.2 | 3.0 | 150 |
| P41 | 3.1 | 1.2 | 61 | 1.2 | 2.4 | 100 |
| P42 | 3.1 | 1.2 | 61 | 1.2 | 4.5 | 275 |
| P43 | 3.1 | 1.2 | 61 | 1.2 | 3.0 | 150 |
| P44 | 3.1 | 1.2 | 61 | 1.2 | 1.6 | 33 |
| P45 | 3.1 | 1.2 | 61 | 1.2 | 2.2 | 83 |
| P46 | 3.1 | 1.2 | 61 | 1.2 | 2.6 | 117 |

| Example | Viscosity* SK.PI without (a2.x) | Viscosity* SK.PI | Viscosity loss in % | Viscosity* SK.PJ | Viscosity* SK.PI + SK.PJ | Viscosity increase[5] in % |
|---|---|---|---|---|---|---|
| P47 | 344 | 51.4 | 85 | 1.2 | 62.7 | 22 |
| P48 | 344 | 51.4 | 85 | 1.2 | 81.3 | 58 |

| Example | Viscosity* SK.PK without (a2.x) | Viscosity* SK.PK | Viscosity loss in % | Viscosity* SK.PL | Viscosity* SK.PK + SK.PL | Viscosity increase[6] in % |
|---|---|---|---|---|---|---|
| P49 | 3.8 | 2.3** | 39 | 1.2 | 11.0** | 378 |
| P50 | 3.8 | 2.3** | 39 | 1.2 | 11.1** | 383 |

*in Pascal seconds;
**the viscosities were measured at a shear rate of 5 s$^{-1}$;
[1]compared to SK.PA;
[2]compared to SK.PC;
[3]compared to SK.PE;
[4]compared to SK.PG ;
[5]compared to SK.PI;
[6]compared to SK.PK; base components SK.PC (with a2.x) were stored for 1 week at room temperature (23° C.) prior to mixing with SK.PC Acrylate Systems
Manufacturing the acrylate Resin System 94.5 parts by weight PMMA Syrup 53/01, 0.5 parts by weight of the bleeding device BYLA 515 and of the inorganic thickener (a1.x) (see tables for amounts) are mixed with the dissolver Pendraulik TD 100 with a serrated disk at 2 to 5 m/s and then for homogenization stirred for an additional 1 minute at 5 m/s, 1 minute at 10 m/s, and 1 minute at 15 m/s. Then, the wetting and dispersing agent (a2.x) (see tables for amounts) and 0.5 parts by weight of the accelerator Pergaquick A150 are added and homogenized for 1 Minute at 10 m/s. After cooling to room temperature (23° C.), the viscosity of the system (SK.AA) is measured. Then, component (b1.x) and the hardener (Peroxan BP powder 50 W+), which together form the base component SK.AB, are added. Then, the mixture is homogenized for 1 minute at 5 m/s and the viscosity measured after 2 minutes (viscosity after incorporation of (b1.x)).

TABLE 38

| | (amounts indicated in g) | | | | | |
|---|---|---|---|---|---|---|
| | Comparative example VA1 | | Comparative example VA2 | | Comparative example VA3 | |
| Components | SK.AA | SK.AB | SK.AA | SK.AB | SK.AA | SK.AB |
| PMMA Syrup 53/01 | 94.5 | | 93.56 | | 93.56 | |
| BYK-A 515 | 0.50 | | 0.50 | | 0.50 | |
| Pergaquick A150 | 0.50 | | 0.99 | | 0.99 | |
| Module A (a1.1) | 5.00 | | 5.00 | | 5.00 | |
| (a2.10) | 0.0 | | 0.0 | | 3.0 | |
| Peroxan BP powder 50W + P powder | | 1.5 | | 1.5 | | 1.5 |
| Module B (b1.3) | | 0.0 | | 1.0 | | 1.0 |

TABLE 39

(amounts indicated in g)

| Components | | Example A1 | | Example A2 | | Example A3 | | Example A4 | |
|---|---|---|---|---|---|---|---|---|---|
| | | SK.AA | SK.AB | SK.AA | SK.AB | SK.AA | SK.AB | SK.AA | SK.AB |
| PMMA Syrup 53/01 | | 94.5 | | 94.5 | | 94.5 | | 94.5 | |
| BYK-A 515 | | 0.50 | | 0.50 | | 0.50 | | 0.50 | |
| Pergaquick A150 | | 0.50 | | 0.50 | | 0.50 | | 0.50 | |
| Module A | (a1.1) | 5.00 | | 5.00 | | 5.00 | | 5.00 | |
| | (a2.x) | 3.0¹ | | 2.0² | | 2.0² | | 2.0² | |
| MEKP Butanox M50 | | | 1.5 | | 1.5 | | 1.5 | | 1.5 |
| Module B | (b1.x) | | 1.0* | | 1.0* | | 1.0** | | 1.0*** |

¹=(a2.11);
²= (a2.1);
*= (b1.3);
**= (b1.1);
***= (b1.2)

TABLE 40

(amounts indicated in g)

| Components | | Example A5 | | Example A6 | | Example A7 | | Example A8 | | Example A9 | |
|---|---|---|---|---|---|---|---|---|---|---|---|
| | | SK.AA | SK.AB | SK.AA | SK.AB | SK.AA | SK.AB | SK.AA | SK.AB | SK.AA | SK.AB |
| PMMA Syrup 53/01 | | 94.5 | | 94.5 | | 94.5 | | 94.5 | | 94.5 | |
| BYK-A 515 | | 0.50 | | 0.50 | | 0.50 | | 0.50 | | 0.50 | |
| Pergaquick A150 | | 0.50 | | 0.50 | | 0.50 | | 0.50 | | 0.50 | |
| Module A | (a1.1) | 5.00 | | 5.00 | | 5.00 | | 5.00 | | 5.00 | |
| | (a2.x) | 3.0¹ | | 4.0² | | 3.0² | | 3.0² | | 3.0² | |
| MEKP Butanox M50 | | | 1.5 | | 1.5 | | 1.5 | | 1.5 | | 1.5 |
| Module B | (b1.x) | | 1.0* | | 1.0** | | 1.0* | | 1.0* | | 1.0** |

¹= (a2.12);
²= (a2.8);
*= (b1.3);
**= (b1.2);
***= (b1.1)

TABLE 41

(amounts indicated in g)

| Components | | Example A10 | | Example A11 | |
|---|---|---|---|---|---|
| | | SK.AA | SK.AB | SK.AA | SK.AB |
| PMMA Syrup 53/01 | | 94.5 | | 94.5 | |
| BYK-A 515 | | 0.50 | | 0.50 | |
| Pergaquick A150 | | 0.50 | | 0.50 | |
| Module A | (a1.2) | 5.00 | | 5.00 | |
| | (a2.10) | 4.0 | | 3.0 | |
| MEKP Butanox M50 | | | 1.5 | | 1.5 |
| Module B | (b1.2) | | 1.0 | | 1.0 |

TABLE 42

(amounts indicated in g)

| Components | | Example A12 | | Example A13 | | Example A14 | | Example A15 | | Example A16 | |
|---|---|---|---|---|---|---|---|---|---|---|---|
| | | SK.AA | SK.AB | SK.AA | SK.AB | SK.AA | SK.AB | SK.AA | SK.AB | SK.AA | SK.AB |
| PMMA Syrup 53/01 | | 94.5 | | 94.5 | | 94.5 | | 94.5 | | 94.5 | |
| BYK-A 515 | | 0.50 | | 0.50 | | 0.50 | | 0.50 | | 0.50 | |
| Pergaquick A150 | | 0.50 | | 0.50 | | 0.50 | | 0.50 | | 0.50 | |
| Module A | (a1.5) | 5.00 | | 5.00 | | 5.00 | | 5.00 | | 5.00 | |
| | (a2.x) | 3.0¹ | | 3.0² | | 3.0⁵ | | 3.0⁴ | | 3.0⁵ | |

TABLE 42-continued (amounts indicated in g)

| Components | Example A12 SK.AA | Example A12 SK.AB | Example A13 SK.AA | Example A13 SK.AB | Example A14 SK.AA | Example A14 SK.AB | Example A15 SK.AA | Example A15 SK.AB | Example A16 SK.AA | Example A16 SK.AB |
|---|---|---|---|---|---|---|---|---|---|---|
| MEKP Butanox M50 | | 1.5 | | 1.5 | | 1.5 | | 1.5 | | 1.5 |
| Module B (b1.2) | | 1.0 | | 1.0 | | 1.0 | | 1.0 | | 1.0 |

[1] = (a2.11);
[2] = (a2.12);
[3] = (a2.13);
[4] = (a2.10);
[5] = (a2.9)

TABLE 43

(amounts indicated in g)

| Components | Example A17 SK.AA | Example A17 SK.AB | Example A18 SK.AA | Example A18 SK.AB | Example A19 SK.AA | Example A19 SK.AB |
|---|---|---|---|---|---|---|
| PMMA Syrup 53/01 | 94.5 | | 94.5 | | 94.5 | |
| BYK-A 515 | 0.50 | | 0.50 | | 0.50 | |
| Pergaquick A150 | 0.50 | | 0.50 | | 0.50 | |
| Module A (a1.5) | 5.00 | | 5.00 | | 5.00 | |
| (a2.1) | 3.00 | | 2.00 | | 1.00 | |
| MEKP Butanox M50 | | 1.5 | | 1.5 | | 1.5 |
| Module B (b1.3) | | 1.0 | | 1.0 | | 1.0 |

TABLE 44

(amounts indicated in g)

| Components | Example A20 SK.AA | Example A20 SK.AB | Example A21 SK.AA | Example A21 SK.AB | Example A22 SK.AA | Example A22 SK.AB |
|---|---|---|---|---|---|---|
| PMMA Syrup 53/01 | 94.5 | | 94.5 | | 94.5 | |
| BYK-A 515 | 0.50 | | 0.50 | | 0.50 | |
| Pergaquick A150 | 0.50 | | 0.50 | | 0.50 | |
| Module A (a1.5) | 5.00 | | 5.00 | | 5.00 | |
| (a2.1) | 3.00 | | 2.00 | | 1.00 | |
| MEKP Butanox M50 | | 1.5 | | 1.5 | | 1.5 |
| Module B (b1.1) | | 1.0 | | 1.0 | | 1.0 |

TABLE 45

(amounts indicated in g)

| Components | Example A23 SK.AA | Example A23 SK.AB | Example A24 SK.AA | Example A24 SK.AB | Example A25 SK.AA | Example A25 SK.AB |
|---|---|---|---|---|---|---|
| PMMA Syrup 53/01 | 94.5 | | 94.5 | | 94.5 | |
| BYK-A 515 | 0.50 | | 0.50 | | 0.50 | |
| Pergaquick A150 | 0.50 | | 0.50 | | 0.50 | |
| Module A (a1.5) | 5.00 | | 5.00 | | 5.00 | |
| (a2.1) | 3.00 | | 2.00 | | 1.00 | |
| MEKP Butanox M50 | | 1.5 | | 1.5 | | 1.5 |
| Module B (b1.2) | | 1.0 | | 1.0 | | 1.0 |

TABLE 46

| Comparative example | Viscosity* SK.AA without (a2.x) | Viscosity* SK.AA | Viscosity loss in % | Viscosity* SK.AB | Viscosity* SK.AA + SK.AB | Viscosity increase[1] in % |
|---|---|---|---|---|---|---|
| VA1 | 25.0 | 25.0 | 0 | ./. | 25.0 | ./. |
| VA2 | 25.0 | 25.0 | 0 | ./. | 476.6 | 1806 |
| VA3 | 25.0 | 10.5 | 58 | ./. | 6.8 | — |

| Example | Viscosity* SK.AA without (a2.x) | Viscosity* SK.AA | Viscosity loss in % | Viscosity* SK.AB | Viscosity* SK.AA + SK.AB | Viscosity increase[1] in % |
|---|---|---|---|---|---|---|
| A1 | 25.0 | 16.8 | 33 | 1.3 | 20.9 | 24 |
| A2 | 25.0 | 8.9 | 64 | 1.3 | 19.8 | 122 |
| A3 | 25.0 | 8.9 | 64 | 1.3 | 36.6 | 311 |
| A4 | 25.0 | 8.9 | 64 | 1.3 | 46.3 | 420 |
| A5 | 25.0 | 17.1 | 32 | 1.3 | 38.2 | 123 |
| A6 | 25.0 | 5.7 | 77 | 1.3 | 30.1 | 428 |
| A7 | 25.0 | 9.9 | 60 | 1.3 | 10.0 | 1 |
| A8 | 25.0 | 9.9 | 60 | 1.3 | 12.9 | 30 |
| A9 | 25.0 | 9.9 | 60 | 1.3 | 96.6 | 876 |
| A10 | 68.7 | 33.8 | 51 | 1.3 | 168.7 | 399 |
| A11 | 68.7 | 66.1 | 4 | 1.3 | 216.0 | 227 |
| A12 | 15.1 | 10.7 | 29 | 1.3 | 43.6 | 307 |
| A13 | 15.1 | 10.8 | 28 | 1.3 | 36.8 | 241 |
| A14 | 15.1 | 5.2 | 66 | 1.3 | 114.8 | 2,108 |
| A15 | 15.1 | 3.8 | 75 | 1.3 | 72.3 | 1,803 |
| A16 | 15.1 | 2.7 | 82 | 1.3 | 50.6 | 1,774 |
| A17 | 15.1 | 6.4 | 58 | 1.3 | 18.3 | 186 |
| A18 | 15.1 | 6.0 | 60 | 1.3 | 18.7 | 212 |
| A19 | 15.1 | 5.2 | 66 | 1.3 | 15.7 | 202 |
| A20 | 15.1 | 6.4 | 58 | 1.3 | 24.4 | 281 |
| A21 | 15.1 | 6.0 | 60 | 1.3 | 26.9 | 348 |
| A22 | 15.1 | 5.2 | 66 | 1.3 | 21.6 | 415 |
| A23 | 15.1 | 6.4 | 58 | 1.3 | 9.2 | 44 |
| A24 | 15.1 | 6.0 | 60 | 1.3 | 10.8 | 80 |
| A25 | 15.1 | 5.2 | 66 | 1.3 | 66.8 | 1,185 |

*in Pascal seconds;
** different: viscosity determined with a Brookfield viscometer at 23° C. with spindle 3 at shear rate of 5 rpm;
[1] compared to SK.AA Module Combinations without Additional Binding Agents
Manufacturing Binding Agent-Free Modules The solvent (PMA=methoxy propyl acetate, benzyl alcohol, styrene or water) and the inorganic thickener (a1.x) (for amounts see tables) are mixed with the dissolver Pendraulik TD 100 with a serrated disk at 2 to 5 m/s and then for homogenization stirred for an additional 1 minute at 5 m/s, 1 minute at 10 m/s, and 1 minute at 15 m/s. Then, the wetting and dispersing agent (a2.x) (see tables for amounts) is added and homogenized for 1 minute at 10 m/s. After cooling to room temperature (23° C.), the viscosity of the systems SK.M, SK.MC, SK.ME, SK.MG and/or MK.MGA is measured. Then, the components SK.MB, SK.MD, SK.MF, SK.MH and/or SK.MJ that contain component (b1.x) are added. Then, the mixture is homogenized for 1 minute at 5 m/s and the viscosity measured after 2 minutes (viscosity after incorporation of (b1.x)).

TABLE 47

(amounts indicated in g)

| Components | | Comp. example M1 SK.MA | Comp. example M1 SK.MB | Comp. example M2 SK.MA | Comp. example M2 SK.MB |
|---|---|---|---|---|---|
| PMA | | 90.0 | | 90.0 | |
| Module A | (a1.1) | 10.0 | | 10.0 | |
| | (a2.x) | 0.0 | | 0.0 | |
| Benzyl alcohol | | | 0.0 | | 0.0 |
| Module B | (b1.1) | | 0.0 | | 2.0 |

TABLE 48

(amounts indicated in g)

| Components | | Example M1 SK.MA | Example M1 SK.MB | Example M2 SK.MA | Example M2 SK.MB | Example M3 SK.MA | Example M3 SK.MB | Example M4 SK.MA | Example M4 SK.MB | Example M5 SK.MA | Example M5 SK.MB |
|---|---|---|---|---|---|---|---|---|---|---|---|
| PMA | | 90.0 | | 90.0 | | 90.0 | | 90.0 | | 90.0 | |
| Module A | (a1.1) | 10.0 | | 10.0 | | 10.0 | | 10.0 | | 10.0 | |
| | (a2.x) | 5.0$^1$ | | 5.0$^1$ | | 5.0$^2$ | | 5.0$^2$ | | 5.0$^2$ | |
| Benzyl alcohol | | | 0.0 | | 0.0 | | 0.0 | | 98.0 | | 98.0 |
| Module B | (b1.x) | | 2.0* | | 1.0** | | 1.0*** | | 2.0* | | 2.0** |

$^1$ = (a2.1);
$^2$ = (a2.4);
\* = (b1.1);
\*\* = (b1.2);
\*\*\* = (b1.3)

TABLE 49

(amounts indicated in g)

| Components | | Example M6 SK.MA | Example M6 SK.MB | Example M7 SK.MA | Example M7 SK.MB |
|---|---|---|---|---|---|
| PMA | | 90.0 | | 90.0 | |
| Module A | (a1.1) | 10.0 | | 10.0 | |
| | (a2.5) | 5.0 | | 5.0 | |
| Benzyl alcohol | | | 98.0 | | 98.0 |
| Module B | (b1.x) | | 2.0* | | 2.0** |

\* = (b1.1);
\*\* = (b1.2)

TABLE 50

(amounts indicated in g)

| Components | | Example M8 SK.MC | Example M8 SK.MD | Example M9 SK.MC | Example M9 SK.MD | Example M10 SK.MC | Example M10 SK.MD |
|---|---|---|---|---|---|---|---|
| PMA | | 87.0 | | 87.0 | | 87.0 | |
| Module A | (a1.4) | 13.0 | | 13.0 | | 13.0 | |
| | (a2.1) | 5.2 | | 5.2 | | 5.2 | |
| Module B | (b1.x) | | 2.6* | | 1.95** | | 1.3*** |

\* = (b1.3);
\*\* = (b1.1);
\*\*\* = (b1.2)

TABLE 51

(amounts indicated in g)

| Components | | Example M11 SK.MC | Example M11 SK.MD | Example M12 SK.MC | Example M12 SK.MD | Example M13 SK.MC | Example M13 SK.MD |
|---|---|---|---|---|---|---|---|
| PMA | | 87.0 | | 87.0 | | 87.0 | |
| Module A | (a1.4) | 13.0 | | 13.0 | | 13.0 | |
| | (a2.4) | 5.2 | | 5.2 | | 5.2 | |
| Module B | (b1.x) | | 2.6* | | 1.95** | | 1.3*** |

\* = (b1.3);
\*\* = (b1.1);
\*\*\* = (b1.2)

TABLE 52

(amounts indicated in g)

| Components | | Example M14 SK.MC | Example M14 SK.MD | Example M15 SK.MC | Example M15 SK.MD | Example M16 SK.MC | Example M16 SK.MD |
|---|---|---|---|---|---|---|---|
| PMA | | 87.0 | | 87.0 | | 87.0 | |
| Module A | (a1.4) | 13.0 | | 13.0 | | 13.0 | |
| | (a2.9) | 5.2 | | 5.2 | | 5.2 | |
| Module B | (b1.x) | | 2.6* | | 1.95** | | 1.3*** |

\* = (b1.3);
\*\* = (b1.1);
\*\*\* = (b1.2)

TABLE 53

(amounts indicated in g)

| Components | | Example M17 | | Example M18 | | Example M19 | |
|---|---|---|---|---|---|---|---|
| | | SK.ME | SK.MF | SK.ME | SK.MF | SK.ME | SK.MF |
| PMA | | 85.0 | | 85.0 | | 85.0 | |
| Module A | (a1.3) | 15.0 | | 15.0 | | 15.0 | |
| | (a2.1) | 6.0 | | 6.0 | | 6.0 | |
| module B | (b1.x) | | 3.0* | | 2.25** | | 1.5*** |

* = (b1.3);
** = (b1.1);
*** = (b1.2)

TABLE 54

(amounts indicated in g)

| Components | | Example M20 | | Example M21 | | Example M22 | |
|---|---|---|---|---|---|---|---|
| | | SK.ME | SK.MF | SK.ME | SK.MF | SK.ME | SK.MF |
| PMA | | 85.0 | | 85.0 | | 85.0 | |
| Module A | (a1.3) | 15.0 | | 15.0 | | 15.0 | |
| | (a2.3) | 6.0 | | 6.0 | | 6.0 | |
| Benzyl alcohol | | | 0.0 | | 0.0 | | 98.5 |
| Module B | (b1.x) | | 3.0* | | 2.25** | | 1.5*** |

* = (b1.3);
** = (b1.1);
*** = (b1.2)

TABLE 55

(amounts indicated in g)

| Components | | Example M23 | | Example M24 | | Example M25 | |
|---|---|---|---|---|---|---|---|
| | | SK.ME | SK.MF | SK.ME | SK.MF | SK.ME | SK.MF |
| PMA | | 85.0 | | 85.0 | | 85.0 | |
| Module A | (a1.3) | 15.0 | | 15.0 | | 15.0 | |
| | (a2.8) | 6.0 | | 6.0 | | 6.0 | |
| Benzyl alcohol | | | 0.0 | | 0.0 | | 98.5 |
| Module B | (b1.x) | | 3.0* | | 2.25** | | 1.5*** |

* = (b1.3);
** = (b1.1);
*** = (b1.2)

TABLE 56

(amounts indicated in g)

| Components | | Example M26 | | Example M27 | | Example M28 | |
|---|---|---|---|---|---|---|---|
| | | SK.MG | SK.MH | SK.MG | SK.MH | SK.MG | SK.MH |
| Styrene | | 85.0 | | 85.0 | | 85.0 | |
| Module A | (a1.5) | 15.0 | | 15.0 | | 15.0 | |
| | (a2.12) | 6.0 | | 6.0 | | 6.0 | |
| Module B | (b1.x) | | 3.0* | | 3.0** | | 3.0*** |

* = (b1.3);
** = (b1.7);
*** = (b1.10)

TABLE 57

(amounts indicated in g)

| Components | | Example M29 | | Example M30 | | Example M31 | |
|---|---|---|---|---|---|---|---|
| | | SK.MG | SK.MH | SK.MG | SK.MH | SK.MG | SK.MH |
| Styrene | | 85.0 | | 85.0 | | 85.0 | |
| Module A | (a1.5) | 15.0 | | 15.0 | | 15.0 | |
| | (a2.3) | 6.0 | | 6.0 | | 6.0 | |
| Module B | (b1.x) | | 3.0* | | 3.0** | | 3.0*** |

* = (b1.3);
** = (b1.7);
*** = (b1.10)

TABLE 58

(amounts indicated in g)

| Components | | Example M32 | | Example M33 | | Example M34 | |
|---|---|---|---|---|---|---|---|
| | | SK.MG | SK.MH | SK.MG | SK.MH | SK.MG | SK.MH |
| Styrene | | 85.0 | | 85.0 | | 85.0 | |
| Module A | (a1.5) | 15.0 | | 15.0 | | 15.0 | |
| | (a2.9) | 6.0 | | 6.0 | | 6.0 | |
| Module B | (b1.x) | | 3.0* | | 3.0** | | 3.0*** |

* = (b1.3);
** = (b1.7);
*** = (b1.10)

TABLE 59

(amounts indicated in g)

| Components | | Example M35 | | Example M36 | |
|---|---|---|---|---|---|
| | | SK.MI | SK.MJ | SK.MI | SK.MJ |
| Water | | 85.0 | | 85.0 | |
| Module A | (a1.5) | 15.0 | | 15.0 | |
| | (a2.1) | 6.0 | | 6.0 | |
| Module B | (b1.6) | | 0.75 | | 3.0 |

TABLE 60

| Comparative example | Viscosity* SK.MA without (a2.x) | Viscosity* SK.MA | Viscosity loss in % | Viscosity* SK.MB | Viscosity* SK.MA + SK.MB | Viscosity increase[1] in % |
|---|---|---|---|---|---|---|
| VM1 | 16.7 | ./. | ./. | ./. | ./. | ./. |
| VM2 | 16.7 | ./. | ./. | ./. | 54.8 | ./. |

| Example | Viscosity* SK.MA without (a2.x) | Viscosity* SK.MA | Viscosity loss in % | Viscosity* SK.MB | Viscosity* SK.MA + SK.MB | Viscosity increase[1] in % |
|---|---|---|---|---|---|---|
| M1 | 16.7 | 0.44 | 97 | 0.3 | 51.0 | 10,491 |
| M2 | 16.7 | 0.44 | 97 | 0.3 | 46.4 | 10,445 |
| M3 | 16.7 | 0.19 | 99 | 0.3 | 1.8 | 847 |
| M4 | 16.7 | 0.19 | 99 | 0.01 | 8.9 | 4,584 |
| M5 | 16.7 | 0.19 | 99 | 0.01 | 31.5 | 16,479 |
| M6 | 16.7 | 1.18 | 93 | 0.01 | 30.6 | 2493 |
| M7 | 16.7 | 1.18 | 93 | 0.01 | 29.2 | 2375 |

TABLE 60-continued

| Example | Viscosity* SK.MC without (a2.x) | Viscosity* SK.MC | Viscosity loss in % | Viscosity* SK.MD | Viscosity* SK.MC + SK.MD | Viscosity increase[2] in % |
|---|---|---|---|---|---|---|
| M8  | 162 | 10.8 | 93 | 0.3 | 98.7  | 814 |
| M9  | 162 | 10.8 | 93 | 0.3 | 184.1 | 1,605 |
| M10 | 162 | 10.8 | 93 | 0.3 | 48.1  | 345 |
| M11 | 162 | 15.7 | 90 | 0.3 | 100.7 | 541 |
| M12 | 162 | 15.7 | 90 | 0.3 | 130.5 | 731 |
| M13 | 162 | 15.7 | 90 | 0.3 | 58.1  | 270 |
| M14 | 162 | 35.1 | 78 | 0.3 | 475.6 | 1,255 |
| M15 | 162 | 35.1 | 78 | 0.3 | 488.2 | 1,291 |
| M16 | 162 | 35.1 | 78 | 0.3 | 108.9 | 210 |

| Example | Viscosity* SK.ME without (a2.x) | Viscosity* SK.ME | Viscosity loss in % | Viscosity* SK.MF | Viscosity* SK.ME + SK.MF | Viscosity increase[3] in % |
|---|---|---|---|---|---|---|
| M17 | 15.1 | 6.7  | 96 | 0.3  | 45.0  | 572 |
| M18 | 15.1 | 6.7  | 96 | 0.3  | 319.2 | 4664 |
| M19 | 15.1 | 6.7  | 96 | 0.3  | 168.0 | 2407 |
| M20 | 15.1 | 35.3 | 80 | 0.3  | 200.3 | 467 |
| M21 | 15.1 | 35.3 | 80 | 0.3  | 754.3 | 2037 |
| M22 | 15.1 | 35.3 | 80 | 0.01 | 419.9 | 1,090 |
| M23 | 15.1 | 4.3  | 98 | 0.3  | 5.1   | 19 |
| M24 | 15.1 | 4.3  | 98 | 0.3  | 21.4  | 398 |
| M25 | 15.1 | 4.3  | 98 | 0.01 | 113.5 | 2,540 |

| Example | Viscosity* SK.MG without (a2.x) | Viscosity* SK.MG | Viscosity loss in % | Viscosity* SK.MH | Viscosity* SK.MG + SK.MH | Viscosity increase[4] in % |
|---|---|---|---|---|---|---|
| M26 | 30.8 | 16.7 | 46 | 0.3 | 163.4 | 878 |
| M27 | 30.8 | 16.7 | 46 | 0.3 | 68.4  | 310 |
| M28 | 30.8 | 16.7 | 46 | 0.3 | 516.6 | 2,993 |
| M29 | 30.8 | 1.0  | 97 | 0.3 | 179.3 | 17,830 |
| M30 | 30.8 | 1.0  | 97 | 0.3 | 18.5  | 1,750 |
| M31 | 30.8 | 1.0  | 97 | 0.3 | 301.8 | 30,080 |
| M32 | 30.8 | 8.1  | 74 | 0.3 | 942.1 | 11,531 |
| M33 | 30.8 | 8.1  | 74 | 0.3 | 603.3 | 7348 |
| M34 | 30.8 | 8.1  | 74 | 0.3 | 1,037.0 | 12,702 |

| Example | Viscosity* SK.MI without (a2.x) | Viscosity* SK.MI | Viscosity loss in % | Viscosity* SK.MJ | Viscosity* SK.MI + SK.MJ | Viscosity increase[5] in % |
|---|---|---|---|---|---|---|
| M35 | 442 | 22.1 | 95 | 1.8 | 34.4  | 56 |
| M36 | 442 | 22.1 | 95 | 1.8 | 217.7 | 885 |

*in Pascal seconds;
[1]compared to SK.MA;
[2]compared to SK.MC;
[3]compared to SK.ME;
[4]compared to SK.MG;
[5]compared to SK.MI

The invention claimed is:

1. Rheology control kit for thickening two- or multi-component systems, comprising
at least one module A, containing
(a1) at least 80% by weight based on the weight of a solid body in module A of one or more inorganic thickeners and
(a2) at least one wetting and dispersing agent that
(a21) inhibits the thickening effect of the inorganic thickener (a1) and at least one module B, containing
(b1) at least 80% by weight based on the weight of a solid body of module B of at least one polymer that
(b11) at least partially removes the inhibition of the thickening effect of the inorganic thickener (a1).

2. Rheology control kit according to claim 1, wherein the inorganic thickener (a1) is selected from the group consisting of layered silicates, precipitated silicic acids and pyrogenic silicic acids.

3. Rheology control kit according to claim 1, wherein the inorganic thickener (a1) is non-organic modified pyrogenic silicic acid or hydrophobically modified pyrogenic silicic acid.

4. Rheology control kit according to claim 1, wherein the wetting and dispersing agent (a2) bonds reversibly to the surface of the inorganic thickener (a1).

5. Rheology control kit according to claim 1, wherein the polymer (b1) can bond to the surface of the inorganic thickener (a1) while at least partially displacing (a2).

6. Rheology control kit according to claim 1, wherein the wetting and dispersing agent (a2) and component (b1) are selected so that one of more of the following functional groups are selected from Group 1: consisting of
imidazolyl groups containing the structural element N—C=N,
amino groups containing the structural elements N for tertiary amines, NH for secondary amines and $NH_2$ for primary amines and
ammonium groups containing the structural element $NH^+X^-$ for ammonium salts from tertiary amines, containing the structural element $NH_2^+X^-$ for ammonium salts from secondary amines and $NH_3^+X^-$ for ammonium salts from primary amines, wherein in each instance $X^-$ stands for the anion of an acid; and /or Group 2: consisting of
hydroxyl groups containing the structural element OH,
carbamide groups containing the structural element HNC(O)CNH for carbamides from primary amines and NC(O)CN for carbamides from secondary amines,
amide groups containing the structural element C(O)N for amides from secondary amines, C(O)NH for amides from primary amines and $C(O)NH_2$ for amides from ammonia,
carboxylic acid groups containing the structural element COOH and
organic phosphoric acid ester groups containing the structural element $OP(O)(OH)_2$; and wherein
(A) the weight percentage proportion of structural elements in the wetting and dispersing agent (a2) selected from the functional groups of groups 1 and 2 is, in relation to the weight of the wetting and dispersing agent (a2), lower than the weight percentage proportion of structural elements in component (b 1) selected from the functional groups of groups 1 and 2 in relation to the weight of component (b 1); and/or
(B) component (b 1) contains a higher weight percentage proportion of structural elements from the functional groups selected from Group 1, in relation to the weight of component (b 1), than the wetting and dispersing agent (a2) of structural elements from the functional groups selected from Group 1 in relation to the weight of the wetting and dispersing agent (a2).

7. Rheology control kit according to claim 6, wherein the weight percentage proportion of structural elements selected from the functional groups of groups 1 and 2 is, in relation to the weight of the wetting and dispersing agent (a2), lower than 11% by weight, and the weight percentage proportion of structural elements selected from the functional groups of groups 1 and 2 is, in relation to the weight of component (b1), greater than or equal to 11% by weight.

8. Rheology control kit according to claim 6, wherein the difference of weight percentage proportions of structural elements between the wetting and dispersing agent (a2) and component (b1) is at least 2% by weight.

9. Rheology control kit according to claim 1, wherein the weight ratio of wetting and dispersing agents (a2) to component (b 1) is 15:1 to 1:5.

\* \* \* \* \*